(12) United States Patent
Ciciriello et al.

(10) Patent No.: US 12,304,650 B2
(45) Date of Patent: May 20, 2025

(54) SYSTEM AND METHOD FOR MACHINE DIAGNOSIS

(71) Applicant: Rolls-Royce Deutschland Ltd & Co KG, Blankenfelde-Mahlow (DE)

(72) Inventors: Lucia Ciciriello, Potsdam (DE); Johannes Gabriel Bauer, Eching (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 187 days.

(21) Appl. No.: 18/124,712

(22) Filed: Mar. 22, 2023

(65) Prior Publication Data
US 2023/0322403 A1     Oct. 12, 2023

(30) Foreign Application Priority Data

Mar. 24, 2022  (EP) ...................................... 22164083

(51) Int. Cl.
| | | |
|---|---|---|
| *B64D 45/00* | (2006.01) | |
| *B64C 29/00* | (2006.01) | |
| *B64D 31/00* | (2024.01) | |
| *B64F 5/60* | (2017.01) | |

(52) U.S. Cl.
CPC ............. *B64D 45/00* (2013.01); *B64D 31/00* (2013.01); *B64F 5/60* (2017.01); *B64C 29/0008* (2013.01); *B64D 2045/0085* (2013.01)

(58) Field of Classification Search
CPC  B64D 45/00; B64D 31/00; B64D 2045/0085; B64F 5/60; B64C 29/0008; G01H 1/006; G05B 23/0221; G05B 19/0421
See application file for complete search history.

(56) References Cited

U.S. PATENT DOCUMENTS

| | | | | |
|---|---|---|---|---|
| 6,859,757 | B2 * | 2/2005 | Muehl .................... | G06Q 10/06 235/375 |
| 11,242,134 | B1 * | 2/2022 | Nguyen ................... | B64F 5/60 |
| 2005/0096873 | A1 | 5/2005 | Klein | |
| 2007/0168157 | A1 * | 7/2007 | Khibnik ................. | G05B 17/02 702/182 |

(Continued)

FOREIGN PATENT DOCUMENTS

| | | |
|---|---|---|
| EP | 3660604 A1 | 6/2020 |
| GB | 2191606 A | 12/1987 |

OTHER PUBLICATIONS

European Search Report dated Sep. 5, 2022 for related European application No. 22164083.2, 8 pages.

*Primary Examiner* — Mussa A Shaawat
(74) *Attorney, Agent, or Firm* — Lempia Summerfield Katz LLC

(57) ABSTRACT

A system includes a frame and a plurality of machines mounted on the frame, wherein each machine of the plurality of machines includes an actuator, and wherein each machine is configured to operate in a defined condition. The system further includes at least one controller configured to control the actuators so as to exert an excitation of each machine of the plurality of machines. The system further includes at least one sensor configured to measure at least one response indicator of a response of the system to the excitations of the plurality of machines. The system further includes a diagnosis system configured to receive the at least one measured response indicator.

20 Claims, 17 Drawing Sheets

(56) References Cited

U.S. PATENT DOCUMENTS

| | | | | |
|---|---|---|---|---|
| 2008/0312756 | A1* | 12/2008 | Grichnik | G05B 19/0423 |
| | | | | 707/999.107 |
| 2010/0017049 | A1* | 1/2010 | Swearingen | B64D 45/00 |
| | | | | 701/31.4 |
| 2012/0323343 | A1* | 12/2012 | Grichnik | G05B 23/0235 |
| | | | | 703/2 |
| 2014/0188332 | A1* | 7/2014 | Wittmaak, Jr. | B64F 5/60 |
| | | | | 701/33.1 |
| 2014/0201571 | A1* | 7/2014 | Hosek | B25J 9/1674 |
| | | | | 714/26 |
| 2015/0105970 | A1* | 4/2015 | Harrigan | F16F 1/00 |
| | | | | 701/32.8 |
| 2018/0066535 | A1* | 3/2018 | Gysling | F01D 21/003 |
| 2019/0146000 | A1* | 5/2019 | Hurst | G05B 23/0254 |
| | | | | 702/144 |
| 2022/0107242 | A1* | 4/2022 | Gilson | B64C 11/16 |
| 2023/0408567 | A1* | 12/2023 | Battut | B64F 5/60 |

* cited by examiner

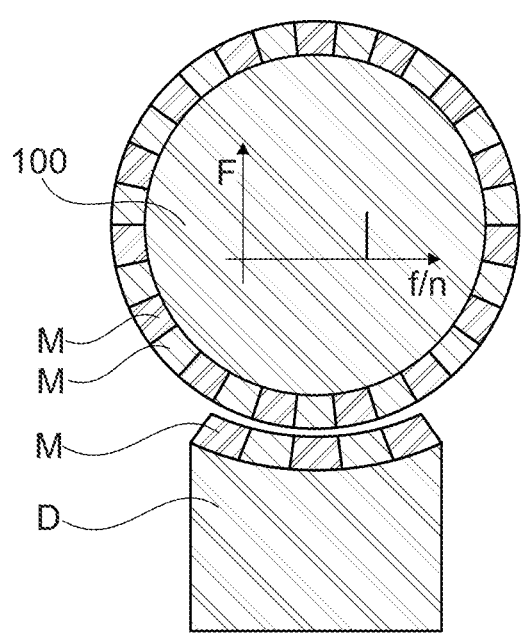 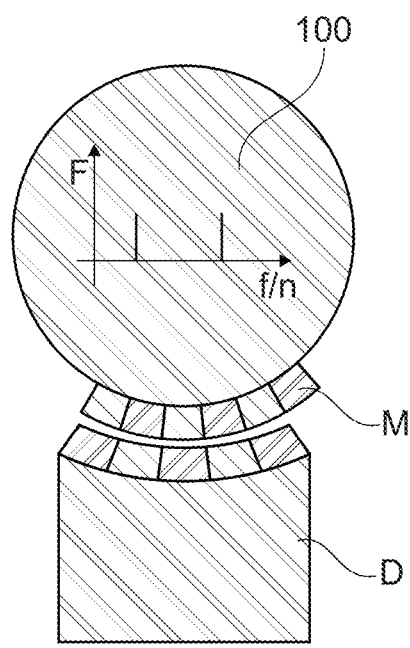
Fig. 20A  Fig. 20B
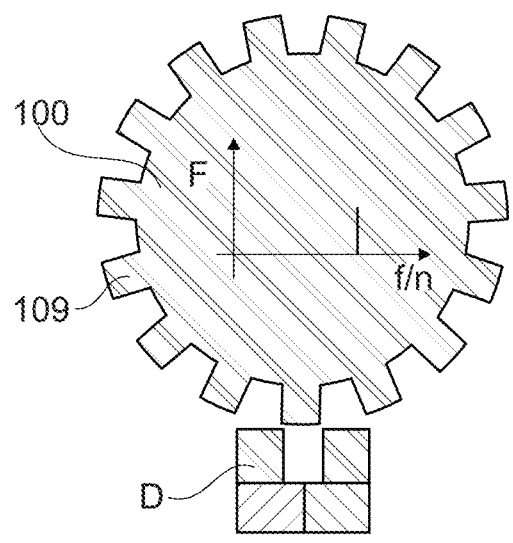 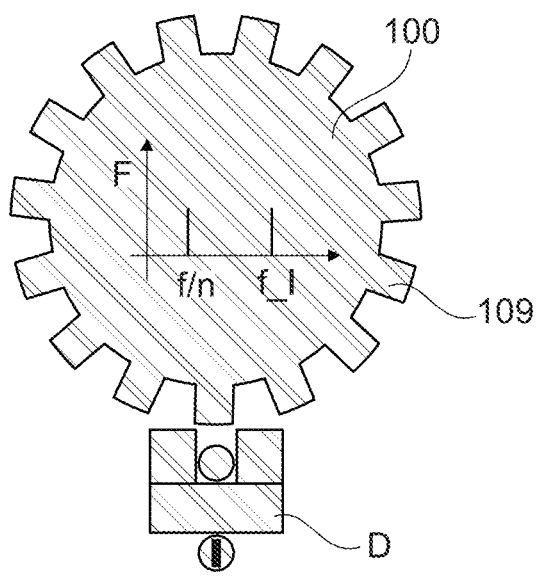
Fig. 21A  Fig. 21B

SYSTEM AND METHOD FOR MACHINE DIAGNOSIS

The present patent document claims the benefit of European Patent Application No. 22 164 083.2, filed Mar. 24, 2022, which is hereby incorporated by reference in its entirety.

TECHNICAL FIELD

The present disclosure relates to a system and a method for acquiring data for machine diagnosis, particularly for a self-diagnostic engine health monitoring.

BACKGROUND

In many applications, particularly in the field of power plants, engines, and drivelines, it is desirable to obtain data to perform a diagnosis of the respective machines.

Commonly, performing such diagnosis is time-consuming. Further, some components may be difficult to analyze in an assembled condition. For this reason, maintenance might be necessary at relatively short intervals.

SUMMARY AND DESCRIPTION

It is an object to allow improved diagnostics of machines.

The scope of the present disclosure is defined solely by the appended claims and is not affected to any degree by the statements within this summary. The present embodiments may obviate one or more of the drawbacks or limitations in the related art.

According to an aspect, a system is provided that includes a frame and a plurality of machines mounted on the frame, each machine having one or more actuators and being operable in a defined condition. The system further includes at least one controller configured to control the actuators so as to exert an excitation of each of the machines (e.g., superimposed to the respective defined condition). The system further includes at least one sensor configured to measure at least one response indicator of a response of the system to the excitations of the machines. The system further includes a diagnosis system configured to receive the at least one measured response indicator.

This allows to perform a diagnosis of the system using the at least one measured response indicator in various defined conditions, such as stand still or a nominal operation. In the case of an aircraft engine, the defined condition may be a takeoff, cruise or landing, or a standstill, to name few examples. For example, acquiring diagnostics data of an engine during a flight of an airplane may increase safety and reduce maintenance times on the ground. Optionally, the diagnosis system is configured to receive the at least one measured response indicator and at least one operating parameter, the least one operating parameter describing the defined condition. The frame (e.g., aircraft frame) may be an assembly of structural elements that together determine a structural resistance, e.g., of the aircraft. The sensor may be a physical sensor or a digital unit, e.g., sensing a parameter in data. The diagnosis system may be configured to receive performance regulation parameters. The operating parameters and the measured response indicators may be treated in the same way (and combined in a state vector); a covariance algorithm may search for contemporarily variations in these values, e.g., including AC parameters, regulations, mechanical sensor output, electrical measured outputs, or the like.

The system may include a plurality of controllers, wherein each controller of the plurality of controllers is configured to control at least one actuator so as to exert an excitation of the respective machine, and, optionally, an overriding controller configured to coordinate the control by the plurality of controllers. By this, a coordinated, e.g., synchronized, performance of the excitations is possible (and, e.g., may take place if a safety overriding controller allows the ping to take place). This allows for locating possible defects in the system, e.g., in the frame or in one or more of the machines in an early stage. An aircraft controller may become an actuator able to exert excitations, for instance, to check a flight controller's stability.

The overriding controller may be configured to coordinate the control by the plurality of controllers with predetermined offsets, e.g., in time. By this, a specific excitation (e.g., a combined time-spatial sequence) of the system is possible In the distributed powerplant. For example, at first, a first group of controllers is controlled to perform an excitation, e.g., in one region of the system. Then another group of controllers is controlled to perform an excitation, e.g., in another region of the system. The responses of both excitations may be compared. If a difference is determined, a defect or an out-of-design condition is manifesting (a drift towards such condition is detected) may be located. Such a safety master controller may be configured to give the permission to the controllers that govern the (e.g., transient) excitation functions to execute the ping (e.g., normally closed switches that are open when the excitation in one or more actuators is allowed).

Alternatively, or additionally, the overriding controller may be configured to coordinate the control by the plurality of controllers simultaneously. This allows, e.g., to excite the whole system.

The system may further include a device providing a phase reference, commonly referred to as keyphasor. The diagnosis system may be configured to determine a phase of the measured response indicator with respect to the phase reference. Optionally, the diagnosis system is further configured to determine a phase shift between the phase of the measured response indicator with respect to the phase reference, and a baseline. It is worth noting that the phase reference may be a fixed physical phase reference tagged on a rotor, or the phase angle may be measured with respect to a harmonic signal, which may be sampled synchronously to the analyzed signal. The baseline may be the phase of a measured response indicator with respect to a corresponding phase reference in the system at a different time, or in another system, e.g., an equally designed system. In particular, the baseline may correspond to the same or similar defined condition, e.g., described by one or more approximately equal operating parameters. This allows to detect even small defects (or out of nominal), as other sources of variations may be widely excluded. A change of a phase shift may be a very significant early indicator, e.g., for a crack or other faults in a component.

The diagnosis system may be configured to combine the at least one measured response indicator and the at least one operating parameter into a state vector. Optionally, the diagnosis system is configured to compare the state vector with another state vector acquired at a different time and/or system. The state vector may include derivatives and/or gradients of one or more operating parameters and/or one or more response indicators. The operating parameters may include target values and/or measured values. The state vector allows a thorough analysis and comparison of the response of the system. Notably, the response may include a measured level of the actual excitation, as generated by the at least one actuator. Alternatively, or additionally, the state vector may include an indication of the target excitation.

The system may include one sensor or a plurality of sensors to measure response indicators. The diagnosis system may be configured to determine which one or more of the response indicators varies (e.g., over time) in response to the superimposed excitation. This allows an early detection of faults.

Optionally, the system includes a plurality of sensors at different locations of the system. Therein, the diagnosis system may be configured to calculate a ratio of the response indicators measured by sensors at different locations. The response indicators may be single values, spectra, distributions, matrices, or the like. The ratio of the response indicators may be a ratio of stiffnesses as measured at different locations.

The diagnosis system may be configured to determine covariances of one or more response and/or excitation indicators and one or more operating parameters to perform a diagnosis of the system. Detecting such covariances allows to locate defects (or out of design). For example, if response indicators, e.g., vibration amplitudes, at two adjacent sensor locations increase at the same time, a fault might be present in that area. It is worth mentioning that a comparison may support spurious reading detections.

Optionally, the diagnosis system includes an artificial intelligence module to determine one or more correlations in one or more response indicators and/or one or more operating parameters to perform a diagnosis of the system. Such an artificial intelligence module may detect correlations that are not known a priori (e.g., because not yet disclosed by analytics or models), in large amounts of data. The detection of contemporarily variations of mechanical and electrical parameters and their correlations at certain system conditions allows for analyzing failure modes more thoroughly. Upon the correlations, the EHM may be designed to monitor the group of parameters that are identified to be the precursors of an incipient failure mode, increasing the effectiveness and reducing the costs.

Each of the excitations may be periodical, an impulse (e.g., a single impulse), a sweep, or a rectangular function. Therein, the diagnosis system may be configured to store a type (e.g., periodical, impulse, sweep, or rectangular) of the excitation of the machine together with the at least one measured response indicator and, optionally, the at least one operating parameter in a memory (the sample frequency at which a set of data is recorded, and the length of the corresponding acquisition buffer may be optimized on the excitation type and sequence). Each controller may be configured to selectively exert one of a predefined plurality of excitations. The controllers may be controlled to exert different types of excitations at the same time. Different excitations may be particularly suitable to detect certain defects in various components.

The at least one measured response indicator may include an electrical parameter, e.g., of power electronics, of the controller and/or of another control unit, of one or more of the machines. Indeed, exerting a mechanic excitation on the machines may induce an electric response in the electrical components of the machines. Thus, even a diagnose of such electrical components is possible with the system. The state vector may include inputs and outputs of one or more controllers of the system.

The diagnosis system may further be configured to determine a ratio of a response indicator and the excitation in a frequency domain. This allows for particularly precisely locating potential defects (e.g., drifts from nominal in a selected number of parameters) in components of the system.

Optionally, the actuators are configured to generate non-contact forces (and/or moments) on the machines to exert the excitations, e.g., electromagnetic forces. Each of the actuators may be a dedicated device. Additionally, or alternatively, one or more electric motors and/or generators of the machines and/or one or more magnetic or air bearings of the machines may be used as the actuators. This allows a self-diagnose of the system without additional active means, wherein also an aircraft controller may be used.

The at least one sensor may include a proximity probe, an accelerometer, or a strain gauge. Alternatively, or additionally, one or more of the machines may include an electric motor and/or generator having a plurality of coils. Optionally, the at least one sensor is configured to receive signals indicative for and/or based on differences among voltages and/or electrical currents of the plurality of coils, and, optionally, to determine a vibration of a shaft of the machine using the signals. This allows to use the electric motor/generator as a sensor probe (e.g., function as an embedded sensor). This allows a particularly high precision of the measurement and, at the same time, a measurement without additional mechanical sensor. Notably, if such an embedded sensor has been calibrated and a range defined, it may not be necessary to have other external sensors, as it may work alone, without necessity of a cross-calibration with a conventional sensor. For example, a possible configuration (e.g., with instrumentation cost minimization) may include an electrical machine and a an embedded displacement sensor to measure shaft movements.

The system may further include an aircraft. Therein, the machines may be engines (or controllers) of the aircraft. The system may be particularly beneficial in use with an aircraft.

According to another aspect of the disclosure, a method is provided. The method includes operating each machine of a plurality of machines mounted on one frame in an operable condition, wherein each machine includes an actuator. The method further includes controlling the actuators so as to exert an excitation of each machine of the plurality of machines (e.g., superimposed to the respective defined condition). The method further includes measuring, by at least one sensor, at least one response indicator of a response of the system to the excitations of the machines. The method further includes receiving, by a diagnosis system, the at least one measured response indicator.

The method may use the system of any aspect or embodiment described herein.

According to a further aspect, a computer-readable storage medium is provided that stores instructions which, when executed by one or more processors (e.g., of the diagnosis system), cause the one or more processors to perform the methods described above and herein. It is worth adding that sample frequency and buffer length may be optimized to reduce data dimensions and therefore costs.

BRIEF DESCRIPTION OF THE DRAWINGS

Embodiments are now described by way of example only, with reference to the schematic Figures, in which:

FIGS. 19 to 23 illustrate examples of different actuators; and

DETAILED DESCRIPTION

Figure 1:
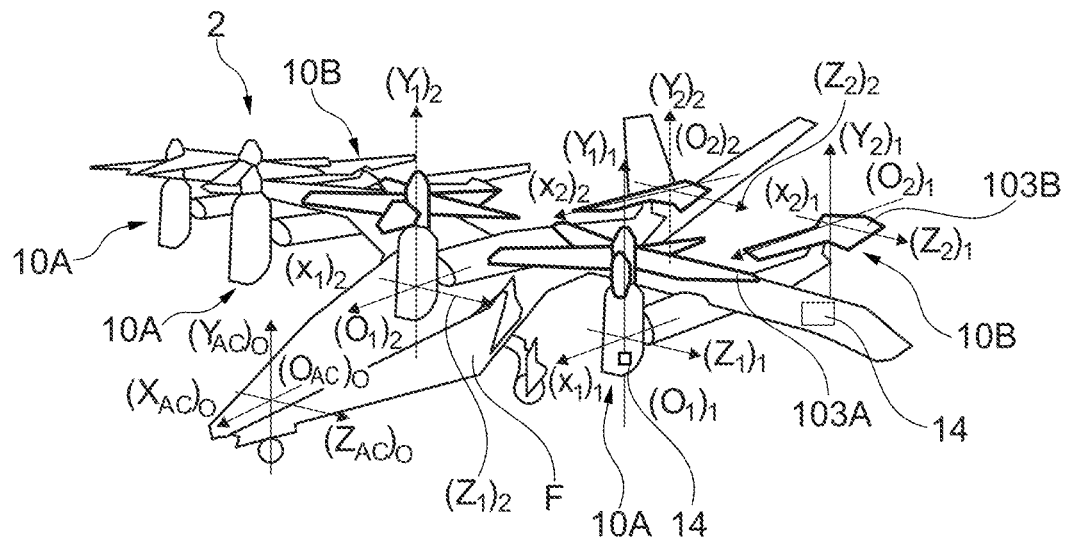
FIGS. 1-3 are different views of an example of an aircraft having a system with plurality of machines.

FIG. 1 shows a perspective view of an aircraft 2 in the form of a vertical takeoff and landing (VTOL) aircraft. The aircraft 2 includes a cabin, wings, and a plurality of machines 10A, 10B. The structure of the aircraft 2 that mechanically connects the machines 10A, 10B (and also the other parts of the aircraft 2) with one another is referred to as the frame F of the aircraft 2.

Each of the machines 10A, 10B includes a propeller 103A, 103B (or a turbomachine). The aircraft 2 has a plurality of (four) front machines 10A, each of which drives a propeller 103A that may be pivoted so as to selectively provide thrust in a (predominantly) vertical direction, or in a (predominantly) horizontal direction. Further, the aircraft 2 includes a plurality of (four) rear machines 10B, each of which driving a propeller 103B that has a fixed orientation of the propeller rotational axis with respect to the frame F. The latter propellers 103B are oriented so as to provide vertical thrust.

The aircraft 2 further includes a plurality of actuators 14 at different locations of the frame F.

Figure 2:
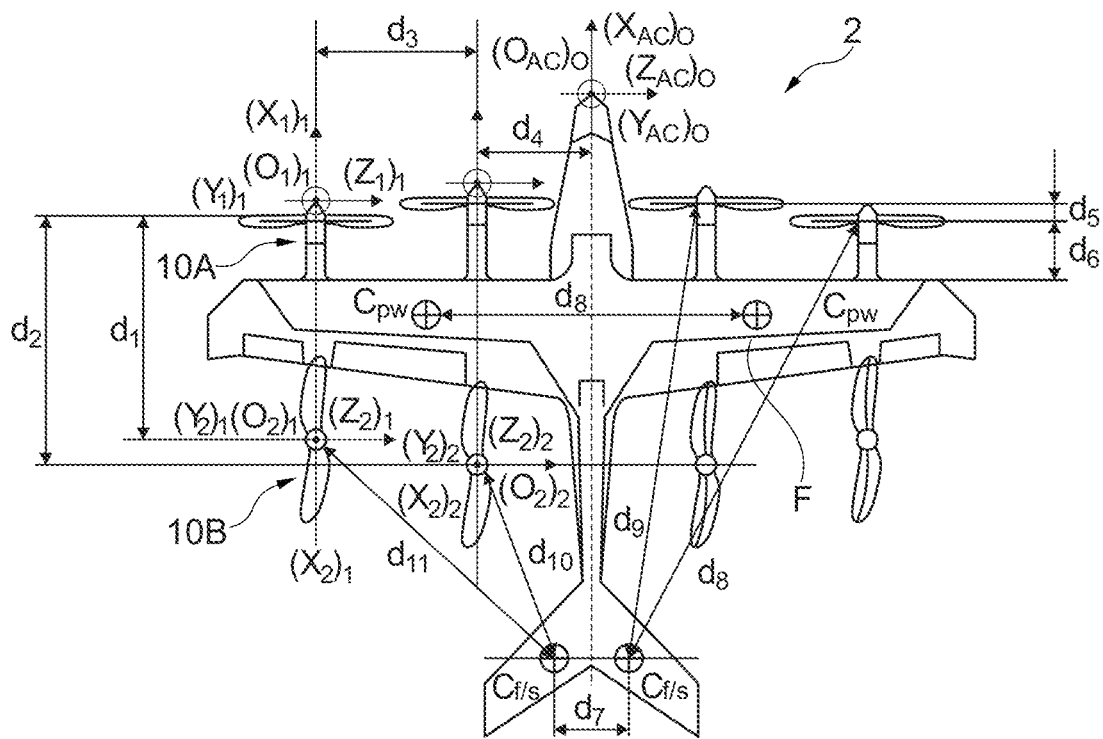
Figure 3:
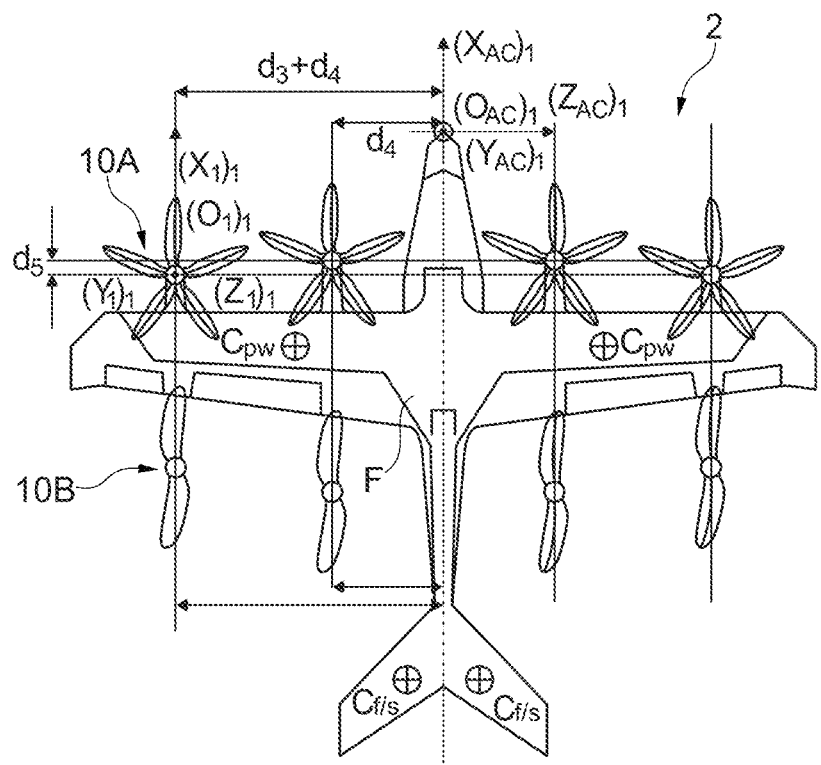

FIGS. 2 and 3 each show a view on the top of the aircraft 2, wherein in FIG. 2 the front machines 10A are oriented so as to provide horizontal thrust, whereas in FIG. 3 the front machines 10A are oriented so as to provide vertical thrust.

FIGS. 1-3 indicate various points O indicated with different indices, and corresponding coordinate systems with origins at these points O. Further points C indicated with different indices are shown on the wings and on rear fins of the aircraft 2, because they represent points of applications of AC forces and moments that are added to the trust and moment locations to verify the stability of the dynamic equilibrium of the aircraft. In the moment in which the short-lasting excitations are applied during a flight condition, the stability of the AC dynamic equilibrium needs to be reverified. FIGS. 1-3 show aircraft installations for a multi-input-multi-output diagnostic system as described below. In a horizontal plane, various distances d1-d11 are shown between these points O and C. These distances are fixed, but due to forces in the operation of the aircraft 2 elastic deformations of the frame F may lead to small changes in these distances d1-d11.

The aircraft 2 is included within a system 1A described with reference to FIG. 4.

Figure 4:
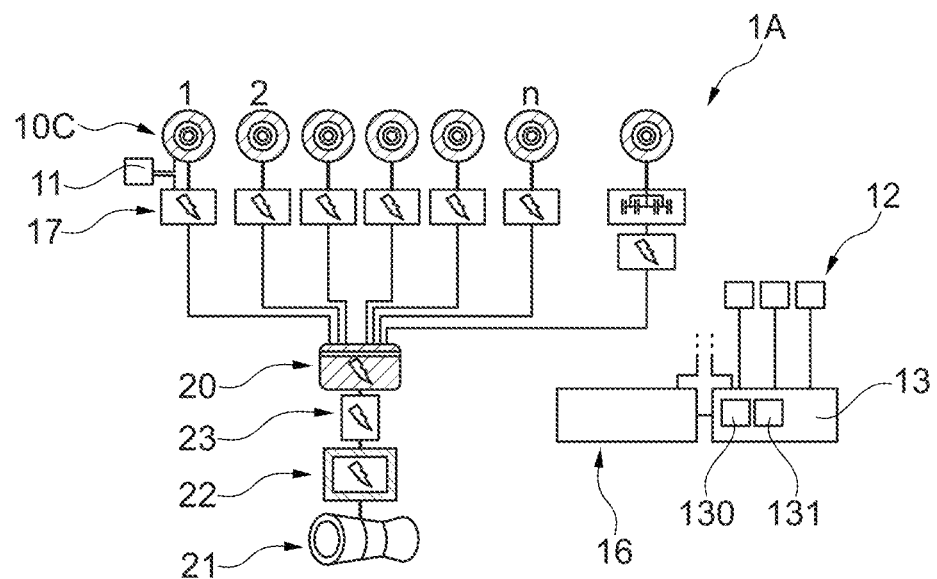
FIG. 4 is a view of an example of a system for an aircraft having a plurality of machines.

FIG. 4 shows a system 1A including an aircraft (e.g., aircraft 2 according to FIGS. 1-3). The system 1A provides propulsion to the aircraft 2. The system 1A includes a plurality of drivelines, each including a propeller 103A, 103B driven by a respective machine 10C here, the machines 10C are electrical machines.

Each of the machines collectively referred to with 10C is designed as one the machines 10A or 10B of the aircraft 2 of FIGS. 1-3. In applications in other aircraft, the machines 10C may be designed differently, e.g., as gas turbine engines. One or more of the drivelines may include a gearbox as exemplarily indicated at the right of FIG. 4.

An energy storage 20 (e.g., a battery) provides electrical power to the machines 10C. An optional gas turbine engine 21 drives an optional generator 22. The generator 22 provides electrical power to the energy storage 20, optionally via power electronics 23.

To be driven, each machine 10C is supplied with electrical power by power electronics 17. The power electronics 17 of each of the machines 10C are supplied with electrical power from the energy storage 20.

Each of the machines 10C includes a controller 11 (one of which being shown in FIG. 4). The controller 11 controls the operation of the respective machine 10C. The system 1A also includes an overriding controller 16. The overriding controller 16 controls the operation of the controllers 11 of the machines 10C.

Vibrations in one driveline may interfere with vibrations in another driveline. Shafts connecting the electrical machines 10C with the respective propeller and the propellers are rotatable components that may perform an orbiting motion around a nominal rotational axis thereof. Further, the frame F may vibrate. Beatings between cross wing motor/engine or in the same multi-spool engine may be present. Because of the relative displacements that may take place during operations, a gap of the electrical machine may change during operations so that the performance of the aircraft may deteriorate. A self-diagnostic EHM concept may addresses primary the resolution of the causes for a loss of performance and structural integrity When one or more of the machines 10C or the frame F develop a defect (or a deterioration of the electrical or mechanical state of the system with respect to a design point), such as a crack, the vibrational properties (or electrical or thermal properties) of these components may change. Thus, mechanic excitations of the system 1A (or of at least one machine 10C thereof) may lead to a different response of the system 1A and to any of the machines 10C or in the aircraft itself. Furthermore, mechanic excitations of the system 1A (or of at least one machine 10C thereof) may lead to movements of a rotor of the electric motors of the machines 10C. By this, mechanic excitations may induce a response in the power electronics 17, 23 of the system, and even in controllers (e.g., controllers 11) of the machines 10C, which react on such an electrical response. If has been found that not only defects (or out-of-design conditions; e.g., all parts are within tolerances but because of a loss of alignment the efficiency of the powerplant drops) in the mechanical structure of the system 1A and its components may lead to an altered response of the system 1A to the excitation, but also defects (or out-of-design conditions) in the electrical components. It has been further found that such excitations may be used to perform a diagnosis of the system 1A and/or one or more of its machines 10C.

Therefore, the system 1A includes a controller 11. The controller 11 is configured to control at least one actuator so as to exert an excitation of the system 1A, in particular of at least one machine 10C of the system 1A. Alternatively, or, as in the present example, additionally, the controller 11 is configured to detect a predetermined excitation of the system 1A, in particular of the machine 10C. Therein, the excitation may be superimposed by the controller to the defined condition of the machine(s) 10C. The defined condition might be a standstill, takeoff, flight, landing, or the like. The excitation might be selectively superimposed for a limited period of time using the actuator. Alternatively, the excitation might be predetermined and present per se. For example, a current ripple present in the operation of the machine(s) 10C may be used as the excitation. Further, an excitation of external effects such as a cross wind may be used.

Each of the electrical motors of the machines 10C may be used as the actuator. Further, dedicated actuators 14 mounted on the frame F and/or on one or more of the machines 10C may be used, see FIG. 1 for examples of arrangements of such actuators 14. Such actuators may be piezo actuators or the like.

The overriding controller 16 is configured to control the individual controllers 11 so as to control which excitations are exerted at what time, and, optionally, the spatial sequence of activation across different actuators distributed on the aircraft.

The system 1A further includes at least one (e.g., several) sensors 12 located one the machine(s) 10C and, optionally, on other parts of the system 1A, e.g., on the frame F. The sensors 12 include one or more proximity probes, accelerometers, and/or strain gauges. The sensors 12 are configured to measure at least one response indicator of a response of one or more of the machines 10C and/or the system 1A to the excitation(s). The response indicator may be a single value, such as a frequency or an amplitude, or it may be a spectrum or distribution. The response indicators may indicate one or more mechanical parameters, such as force or torque, or one or more electrical parameters, such as current or voltage.

The machines 10C are operable in a defined condition described by at least one operating parameter. The at least one operating parameter may include velocity, speed, altitude, and/or the like. The at least one operating parameter may also indicate the type of operation.

The system 1A further includes a diagnosis system 13 configured to receive the at least one measured response indicator and the at least one operating parameter. Based thereon, the diagnosis system 13 performs a diagnosis of the system 1A and of the machines 10C.

For this purpose, the diagnosis system 13 includes a memory to store the measured response indicators (e.g., including a real level, frequency, phase and/or duration of the exerted excitation for calculating transfer functions, e.g., in the power electronics) and operating parameters. Specifically, the diagnosis system 13 may combine the measured response indicators and the operating parameters of one diagnosis procedure into a state vector, and to compare the state vector with another state vector acquired at a different time and/or with another system. The state vector may include parameters describing the excitation, parameters describing the response, and parameters describing the defined condition. Potential state vector parameters are: DC current, voltage and/or power harmonics, phase current and/or voltage harmonics, phase current ripple, rotor position harmonics, auxiliary supply power and temperatures of switches, capacitors, and a driver stage (of an inverter). In the state vectors, maintenance logged data and evidence may also be included for detecting cross correlations.

By calculating one or more ratios of the response indicators, e.g., measured by sensors 12 at different locations, the diagnosis system 13 may detect deviations which might stem from a defect or from an out-of-design (or out-of-specification) condition approaching. Further, state vectors may be monitored by the diagnosis system 13 over time. A change in certain response indicators, particularly at unchanged operational parameters, may indicate a developing defect or from an out-of-design condition approaching. Also, the determination of covariances of one or more response indicators and/or one or more operating parameters by the diagnosis system 13 may reveal defects or an out-of-design (or out-of-specification) condition (state) approaching, e.g., when two indicators and/or parameters change at the same time which normally do not. However, the state vector may include a large number of indicators and parameters, as well as derivatives and gradients, so an analysis may be time consuming. Therefore, the diagnosis system 13 includes an artificial intelligence module 130 (AI module 130) that employs an artificial intelligence, e.g., a machine learning algorithm. For example, the AI module 130 may include a neural network or a simpler smart data algorithm. The AI module 130 may find more hidden correlations between individual data points. The EHM may focus on selectively detecting and distinguishing effects of anomalies in both the mechanical and electrical systems as interacting together. The ping functionality may be used to filter and isolate the response that is being measured for diagnostic purposes. After having identified the main indicators of the combined failure modes, probabilistic previsions may be implemented in a particularly meaningful way.

Notably, the diagnosis system 13 may be configured to receive and store the executed excitations as well. For instance, the magnitude, phase lag, frequency, and/or time persistence of a harmonic current ripple may be received and stored (e.g., in the state vector). The executed real excitation may be different from the target excitation. Transfer functions may be calculated by the diagnosis system 13. The level of excitation or frequency range may be accounted for when evaluating the response, also, in the case of excitations to produce a non-linear response in one or more controllers.

Time variable excitation forces may be considered transients in many of the cases not longer than 1 to 2 seconds. However, the stability of the aircraft subjected to those excitations need to be substantiated to certify the system for flight interrogations. Orientations and locations may be provided for the evaluation of the dynamic equations' solutions stability. Controlled load factors may in turn be the results of an aircraft and power plant controller law and loop, and therefore subjected to stability condition as well.

Summarizing, the system 1A includes a frame F (see, e.g., FIGS. 1-3) and a plurality of machines 10A-10C mounted on the frame F, each machine 10A-10C having an actuator 101, 102, 14 and being operable in a defined condition. The system further includes one or more controllers 11 configured to control the actuators 101, 102, 14 so as to exert an excitation of each of the machines 10A-10C superimposed to the respective defined condition. The system further includes at least one sensor 12, 108 configured to measure at least one response indicator of a response of the system 1A to the excitations of the machines 10A-10C. The system further includes a diagnosis system 13 configured to receive the at least one measured response indicator. The maximum magnitude necessary for the excitation may be defined to be less than 5% of the maximum load (or power) capacity of the actuator and/or machine. This may be based on a calculation of the corresponding influence coefficients.

Notably, the diagnosis system 13 may be, in part or completely, mounted in the airplane 2. Further, the diagnosis system 13 may be, in part or completely, mounted at a location different from the aircraft, e.g., on the ground. In any case, the diagnosis system 13 may communicate with the sensors 12. The diagnosis system 13 may also communicate with the overriding controller 16 and/or one or more of the controllers 11. Further, a part of the diagnosis system 13 may be mounted in the airplane 2 and another part may be mounted at a location different from the aircraft, e.g., on the ground.

Figure 5:
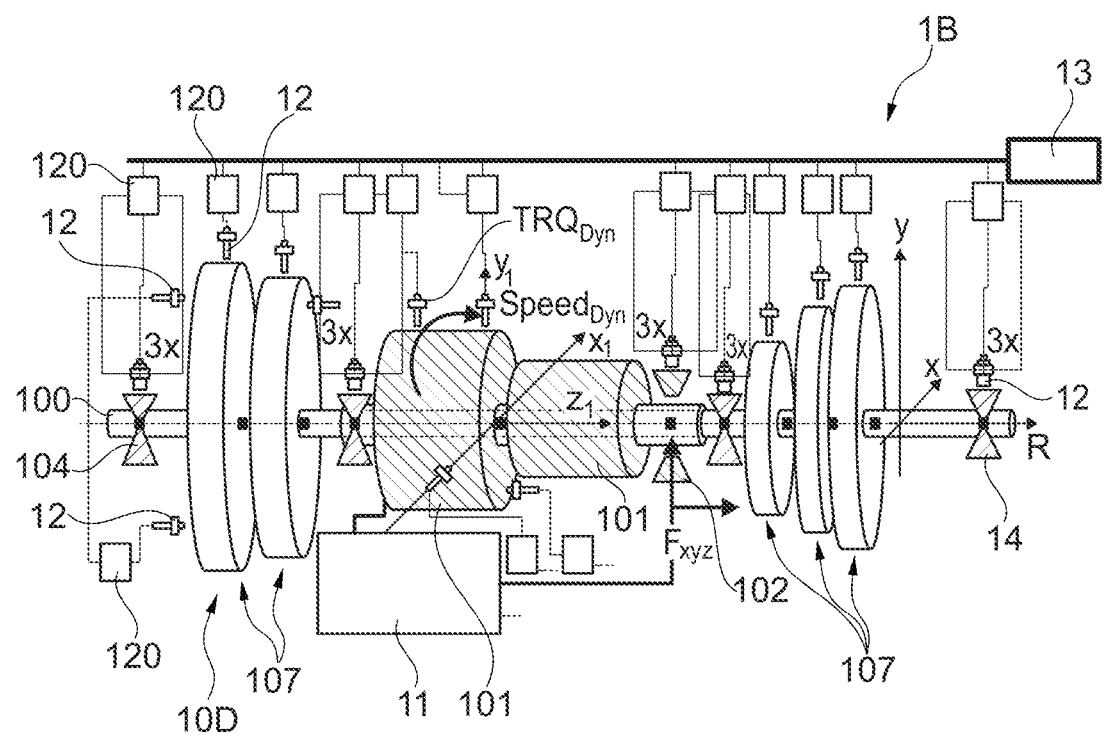
FIG. 5 is a view of an example of a system having one machine with several actuators and sensors.

FIG. 5 shows a single-machine system 1B for an aircraft. One or more of the machines 10A, 10B of the aircraft 2 of FIGS. 1-3 may be designed as the system 1B of FIG. 5.

The system 1B includes a (e.g., one) machine 10D. The machine 10D of the present example is an electrical machine, but a hybrid-electrical machine would also be conceivable. The machine 10D includes a shaft 100 rotatable about a rotational axis R. The shaft is driven by at least one electric motor 101 (which particularly may be a motor-generator). In the present example, the shaft 100 is driven by two electric motors 101. In addition, the machine 10D may include a combustion chamber that receives air from a compressor and generates hot combustion gases that drive a turbine. In this example, the shaft 100 is driven solely by the electric motors 101 as an electrical machine. Several rotating components 107 are shown that are driven by the shaft 100. These may include one or more propellers and/or one or more flywheels, to name some examples.

The shaft 100 is rotatably supported by bearings 104 (e.g., contact bearings). Furthermore, a magnetic bearing 102 is provided at the shaft 100. The magnetic bearing 102 may be used to support the shaft 100.

The system 1B further includes a plurality of sensors 12. Each of the sensors 12 is connected to a corresponding data acquisition unit 120 reading the respective sensor 12 and providing sensor values and/or (e.g., preprocessed) measured response indicators to a diagnosis system 13 of the system 1B.

The sensors 12 measure axial and radial displacements of various parts of the system 1B, wherein three sensors 12 may be circumferentially distributed to exactly determine the position of the respective component. The sensors 12 of this example are proximity probes.

The electric motor 101 and the magnetic bearing 102 exert non-contact forces, more precisely, electromagnetic forces, on the shaft 100. The electric motor 101 and the magnetic bearing 102 may be used as actuators. A controller 11 of the system 1B is configured to control the electric motor 101 and the magnetic bearing 102 so as to exert an excitation of the machine 10D. Alternatively, or additionally, the controller 11 is configured to detect a predetermined excitation of the machine 10D, e.g., a cross wind, by a corresponding sensor.

The excitation is superimposed to the defined condition of the machine 10D. The defined condition may be an operating condition. The defined condition may be a steady operating condition. For example, if the machine 10D is in motion, in particular, in a constant motion, the controller may be configured to selectively superimpose the excitation for a limited period of time. The limited period of time may be 10 seconds or less, 3 seconds or less, in a range of 1 and 2 seconds, or less than 1 second, or less than 2 seconds, in particular, when the aircraft is in flight. For tests on the ground, the period of time may optionally be longer. Alternatively, the controller may control the electric motor 101 and/or the magnetic bearing 102 with current ripples or another excitation continuously. For example, the electric motor 101 may be controlled to perform the excitation in circumferential direction, e.g., to apply a dynamic torque. However, by applying asymmetrical currents to the coils of the electric machine 101, also radial forces may be applied as an excitation. Further, the controller 11 may control the magnetic bearing 102 so as to exert the excitation in a radial direction and/or in an axial direction.

The diagnosis system 13 receives the at least one measured response indicator and, optionally, the at least one operating parameter.

An excitation may be exerted in regular time intervals and/or engine cycles and/or upon operator demand.

An excitation may be exerted in a tangential direction, a radial direction, and/or an axial direction (with respect to the nominal rotational axis R).

Figure 6:
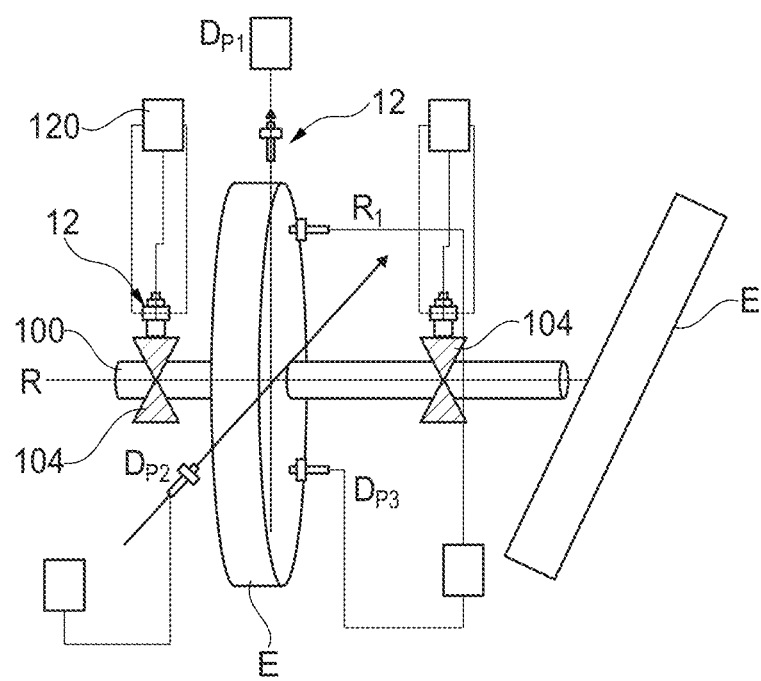
FIG. 6 is a view of the arrangement of a plurality of sensors of the system of FIG. 5.

FIG. 6 shows a section of the shaft 100 and one rotating element E fixedly mounted on the shaft 100. A first sensor 12, DP1, measures in the radial direction. A second sensor 12, DP2, also measures in the radial direction, but from a different position, e.g., in a direction perpendicular to the first sensor 12, DP1. A third sensor 12, DP3, measures in the axial direction. These three sensors 12 are proximity probes to determine a displacement of the rotating element E. A further sensor 12, R1, is provided to measure an angle of the rotating element E with respect to the nominal rotational axis R. Such an angle is depicted in exaggerated form at the right side of FIG. 6. Further sensors 12 are provided at the bearings 104. Using the sensors 12, the diagnosis system 13 (or another unit of the system 1B) may determine the position of the centerline of the shaft 100. Further, it may determine the position and orientation of the rotating element E. The sensor signals may be used as, or to determine, measured response indicators. When superimposing the excitation, a movement, vibration or the like may occur in a manner that is dependent on the existence of defects, such as a crack.

FIGS. 7A-7G show, in diagrams of amplitude versus time, possible excitations for superposition.

Figure 7A:
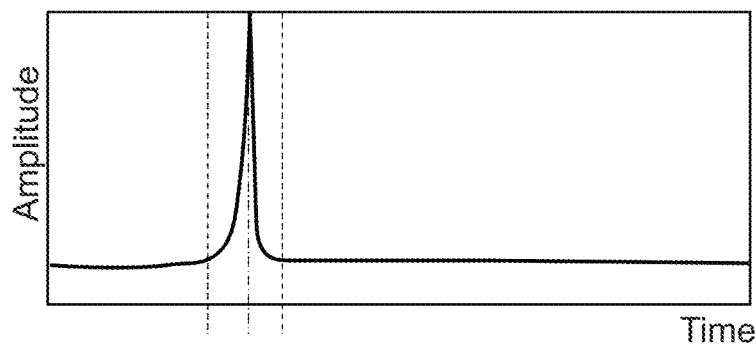
FIGS. 7A-7G are diagrams illustrating examples of various excitations to be exerted on a system.

FIG. 7A shows an excitation in the form of an impulse, e.g., a single peak. This excitation may be used for a broadband excitation to measure frequency response functions of rotors, the frame F. This further allows to measure, e.g., modal damping and peak phases, a variation of vibration parameters across different sensor locations, and variations of magnitude ratios in x, y, and z directions. For electric components, this excitation may be used to swap energy from the magnetic fields into a DC link capacitor and to check the capacity.

Figure 7B:
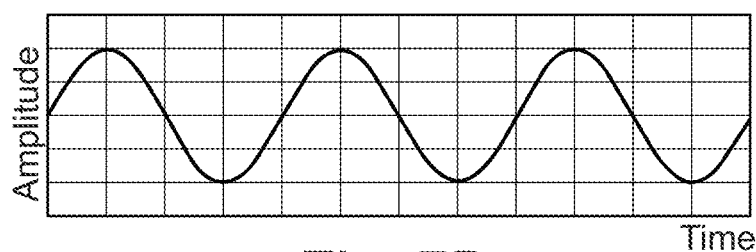

FIG. 7B shows an excitation in the form of a periodic function, namely, a sinusoidal function, with a constant amplitude and frequency. This allows for exciting specific natural frequencies, ratios between specific natural frequencies, phase variation measurements, or ratios between different locations and directions. For electric components, this may be used to check a symmetry of an AC response and to detect inductance variations in the machine, e.g., due to a short circuit, faults in power switches, etc.

Figure 7C:
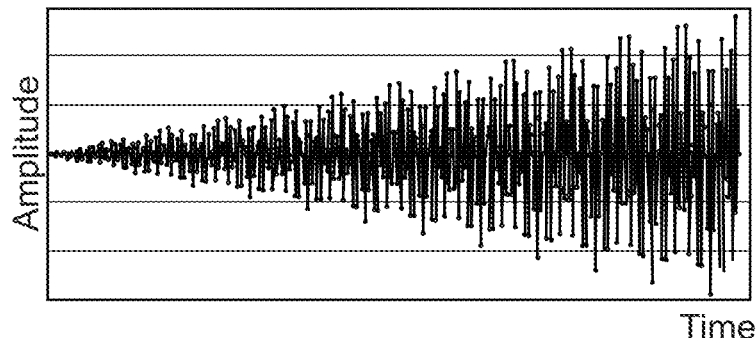

FIG. 7C shows an excitation in the form of a periodic function, namely, a sinusoidal function, with a variable amplitude and a constant frequency. This allows to excite specific natural frequencies, ratios between specific natural frequencies, phase variation measurements, ratios between different locations and directions, and modal damping variations.

Figure 7D:
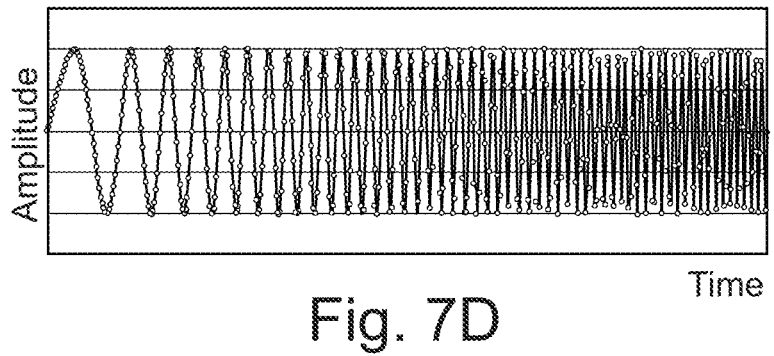

FIG. 7D shows an excitation in the form of a periodic function, namely, a sinusoidal function, with (at least predominantly) a constant amplitude and a variable frequency. This is a sweep function. This also allows to excite specific natural frequencies, ratios between specific natural frequencies, phase variation measurements, ratios between different locations and directions, and modal damping variations. This also allows for monitoring AC characteristics.

Figure 7E:
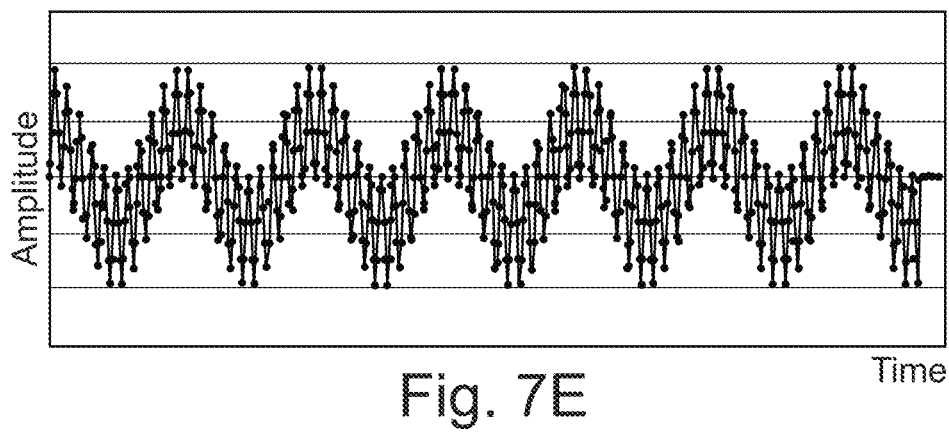

FIG. 7E shows an excitation in the form of a modulation of two functions, in this example of two sinusoidal functions at different (each constant) frequencies. This allows for testing the dynamic stability of the system, variations of the forced response of the system, variations of damping, and a drift in the system stability.

Figure 7F:
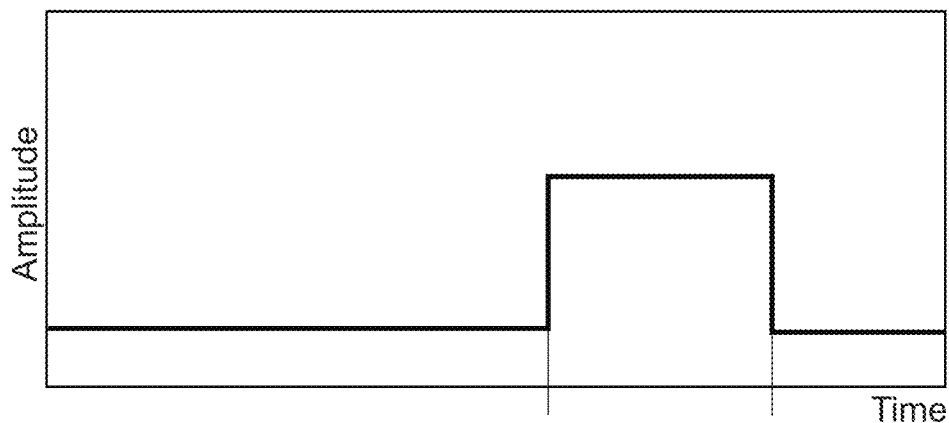

FIG. 7F shows an excitation in the form of a rectangular function. This allows for testing the response to a step and at different locations.

Figure 7G:
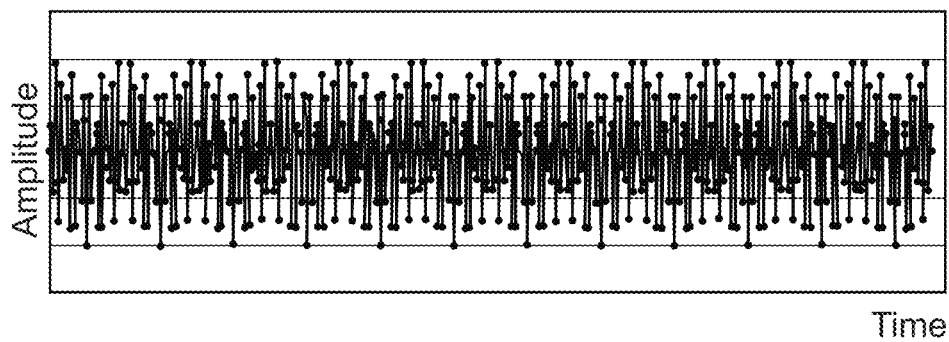

FIG. 7G shows an excitation in the form of a noise, e.g., white noise or pink noise. This excitation may be used for a broadband excitation for frequency response functions and variations over different locations and directions.

Notably, two or more of the excitations shown in FIGS. 7A-7G may be superimposed.

An actuator of the system may be configured to generate variable torque, and/or radial and/or axial forces, and/or capable to generate time variable, frequency variable, magnitude variable and/or phase variable moments, and/or loads in a controlled manner.

In any system described herein, the controller(s) 11 and/or overriding controller 16, may be configured to impose one or more different excitations, e.g., the excitations described above, selectively, and/or the same or different excitations at the same time using more than one actuator. The plurality of sensors 12 allow to measure multiple response indicators. The systems therefore allow a multiple-input-multiple-output, MIMO, analysis.

Figure 8:
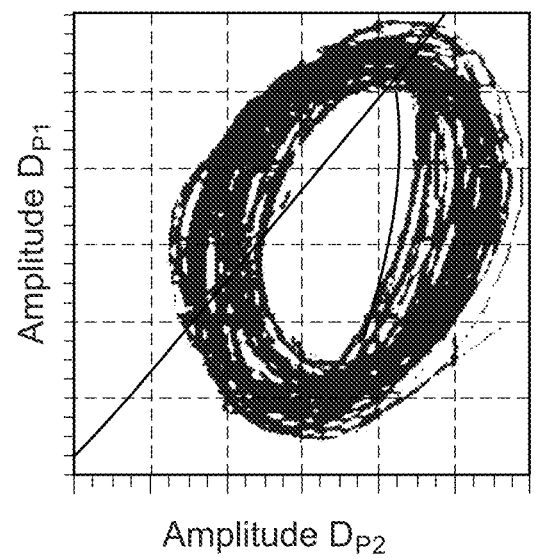
FIG. 8 is a diagram illustrating a position of the center of a shaft of the machine of FIG. 4.

FIG. 8 shows the position of the centerline of the shaft 100 as measured by the sensors 12 DP1 and DP2 shown in FIG. 6 over a period of time. As may be seen, the centerline describes an orbiting motion. The magnitude of this orbiting motion may be indicative of a defect in the machine 10D. Thus, a parameter describing the orbiting motion, e.g., a frequency, an eccentricity, a radius or the like, or, more generally, a parameter describing the position of the centerline of the shaft, may be used by the diagnosis system 13 as measured response indicator to perform a diagnosis of the machine 10D.

Figure 9:
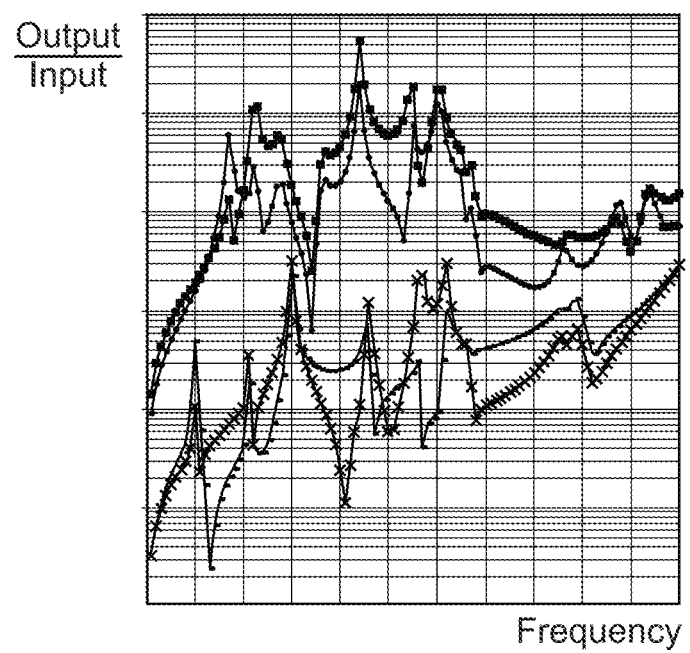
FIG. 9 a diagram showing examples of frequency spectra and illustrating an identification of natural frequencies and resonances with a harmonic source of excitation.

FIG. 9 shows ratios of measured response indicators divided by an excitation input versus frequency. Deviations over time at single or multiple sensor locations may indicate a defect in a respective location.

The operational condition of the system 1A, 1B may be defined by a state vector in a k-dimensional space. Each dimension corresponds to one of the relevant dynamic parameters, setting of performances regulation, electronics parameters such currents and voltages, aircraft regulations, e.g., flap, weight, bank angle, and/or flight conditions.

The time at which any of the measures is taken may therefore completely characterized only by a k-dimensional vector that, e.g., defines the minimum quantities that are necessary to unequivocally identify an operational performance point of the machine, as on the aircraft. Therein, k is the number of operating parameters and response indicators that are included in the state vector.

For a hybrid electric machine, the status vector may include: dynamic parameters, shaft speeds, torque levels, propeller pitch angles, propeller axis orientation, power levels, variable vane angles, fuel specific consumption, temperatures, pressures, voltage levels, current levels, battery levels, flight altitude and/or bank angles. This state vector is therefore defined for each instant of time at which the self-diagnostic multi-input excitation multi-output diagnostic analysis is being actuated.

A fleet data base may be included by the system 1A, 1B to store the relevant flight and/or maintenance (grounded) acquired conditions that are characterized by the above defined k-dimensional state vector.

To facilitate the identification of the severity of variation trends in one or more mechanical or electrical response indicator the k-dimensional vector may be associated to a two-times-k-dimensional vector that defines nominal intervals (ranges) for each of the parameter contained in the state vector. This vector represents a nominal state vector. It is worth noting that this 2 k-dimensional vector that defines the allowable range for each parameter in the state vector is in turn a function of speed, power, flight conditions etc. Further it may vary versus time (e.g., to account for higher clearances that are caused by wear and tear accumulated during flight missions). The upper and lower extremes of the nominal intervals contained in the 2 k-dimensional range vector represent alarm values for each parameter (optionally, warning and not-to-exceed alarms are defined within the nominal state vector). The diagnosis system 13 may use the state vector and/or the nominal state vector for diagnosis.

For example, the number of dimensions of the state vector is defined so as to unambiguously describe the state of the machine, e.g., system performance conditions, dynamic conditions, voltages and currents.

Notably, the response of the system is determined by forces and moments that are generated in a mechanical domain (which includes dynamics, aerodynamics, materials, thermal properties etc.) and by electromagnetic fields/forces of an electromagnetic domain. These two domains interact each other (in a cross domain) and this interaction is expected to affect the response of the system, which therefore will not be the simple sum of the mechanical and electrical response. The diagnosis system 13 is configured to detect a variation of the state vector.

The state vector may include one or more speeds, one or more temperatures, one or more pressures, an altitude, one or more derivatives of any of the parameters and/or one or more gradients of any sensor-measured response indicator in the field of differently located sensors.

Frequency response functions translate forcing functions due to the excitation (electromagnetic forces, controlled impulses by movable parts, e.g., propellers, a variable geometry nozzle etc., or due to operations, e.g., an unbalance, lightning, gusts etc.) into a system response (a response of the mechanical system components, a response of the electrical system components, a response of the controllers and a response in cross-domains which may be non-linear). All responses may be compared with the nominal state vector defining nominal limits for all parameters.

A possible consequence if the diagnosis system 13 detects a fault, is e.g., the avoidance of a specific speed range until the next maintenance.

Figure 10:
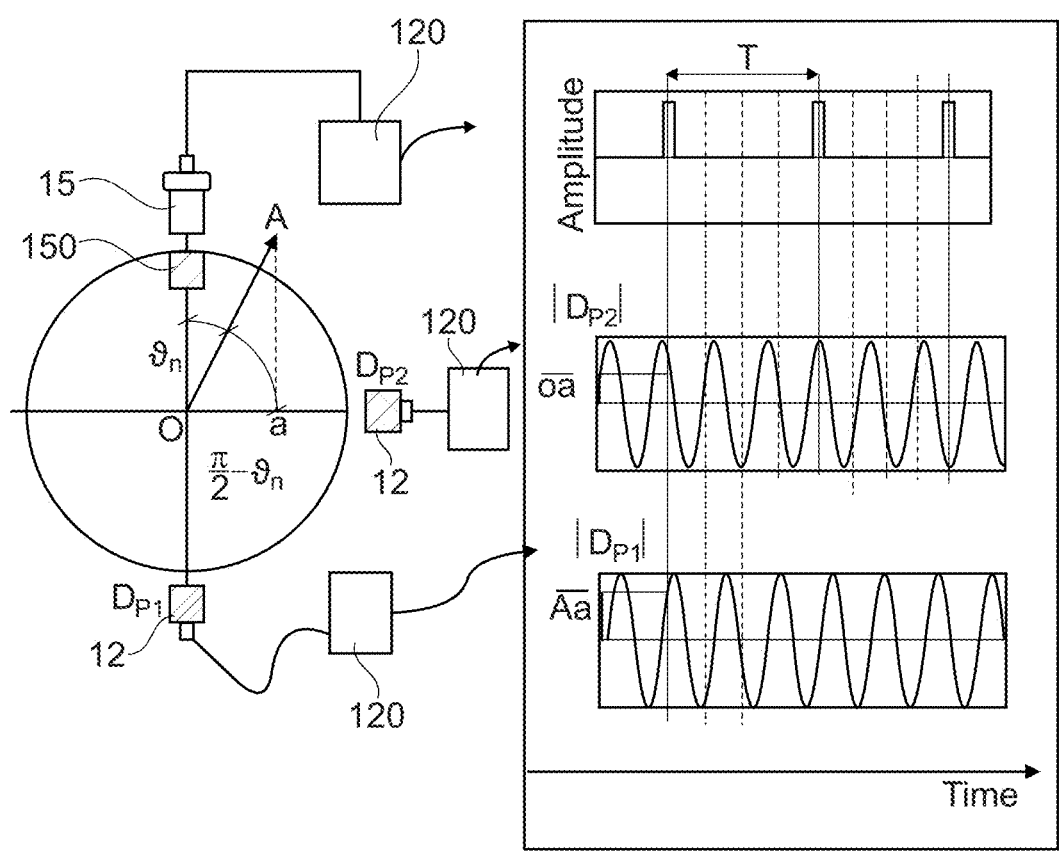
FIG. 10 shows an example of an arrangement of sensors for a phase shift measurement.

FIG. 10 shows a keyphasor 15 of the machine 10D, however, any of the machines herein may include such a keyphasor 15. The keyphasor 15 provides a phase reference. Specifically, the keyphasor 15 detects a target 150 fixedly mounted on any rotating element E of the machine 10D. The signal provided by the keyphasor 15 is shown on the right side of FIG. 10. At constant speed of the shaft 100 it provides impulses at regular time intervals. The distance between two intervals corresponds to one turn of the shaft 100. The target impulse serves as an angular reference. The positions of the pulses of the keyphasor 15 along the x axis (upper diagram) provide the corresponding phase angles. The other two sensors 12 are distance probes to measure an orbit of the rotating element. The amplitudes of these two sensors 12 are illustrated in the middle and lower diagrams. The amplitudes of these two sensors 12 may be analyzed by the diagnosis system 13.

The diagnosis system 13 is configured to determine a phase of a measured response indicator with respect to the phase reference, wherein the diagnosis system 13 is configured to determine a phase shift between the phase of the measured response indicator with respect to the phase reference, and a baseline (e.g., a previous measurement).

Notably, the analysis unit 13 may use the keyphasor 15 target 150 as reference for a phase analysis. Alternatively, the phase of the excitation input may be used by the analysis unit 13 as phase reference (e.g., for comparison with a measured response indicator).

The diagnosis system 13 may determine a vibration vector defined by magnitude, direction, phase angle, and frequency.

Figure 11:
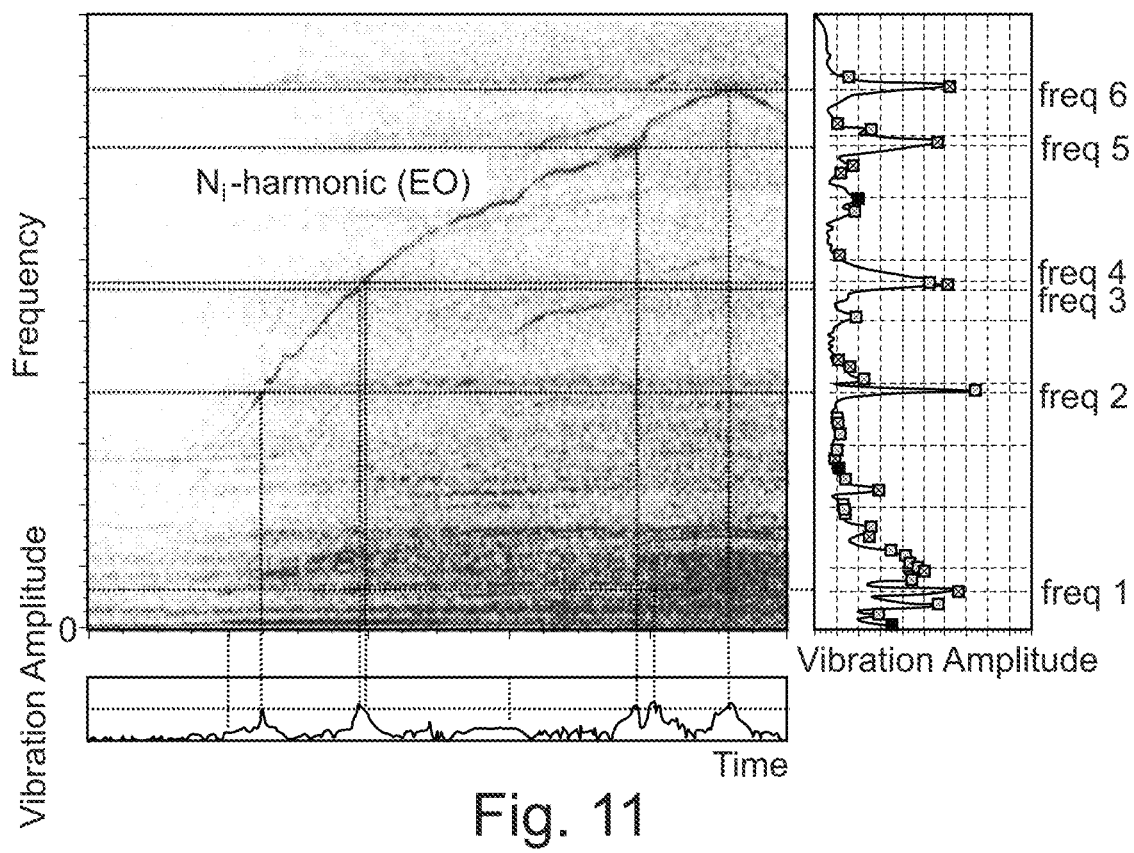
FIG. 11 shows diagrams of an example of a frequency analysis versus time.

FIG. 11 shows a frequency spectrum measured with one of the sensors 12 versus time. Several lines may be seen that correspond to the speed of the shaft and multiples (engine orders, EO) thereof. It may be seen that specific frequencies are particularly pronounced. The diagnosis system 13 may perform a frequency analysis of the measured response indicators. The diagnosis system 13 may perform a Fourier analysis. The frequency spectra obtained with excitation may be compared to spectra obtained without excitation or with the same excitation at another location and/or time and/or at the same or similar defined conditions. Differences may indicate a defect.

Figures 12A, 12B:
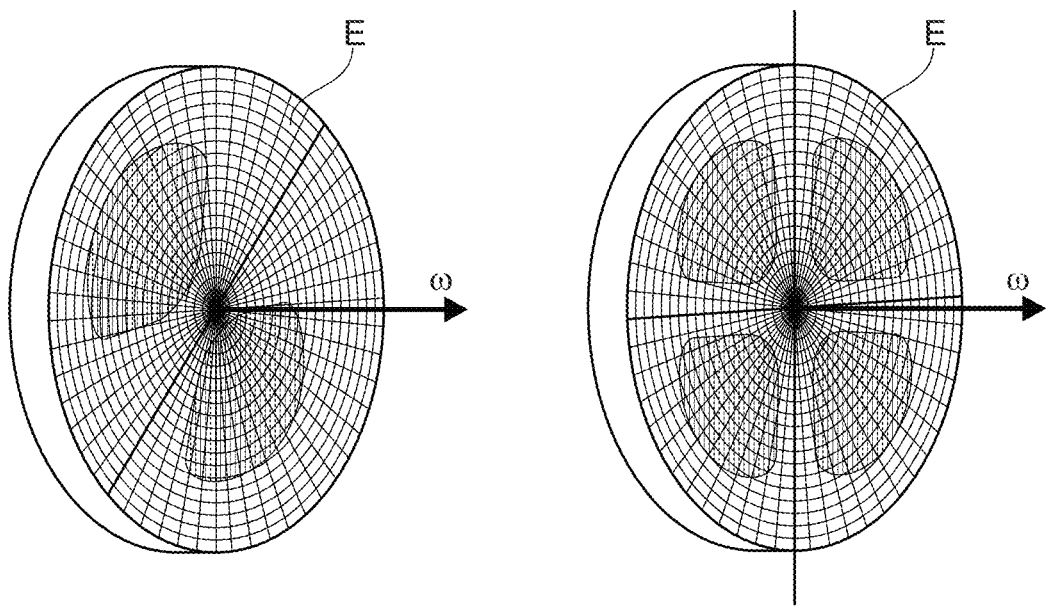
FIGS. 12A and 12B show examples of different mode shapes of a rotatable element.

FIGS. 12A and 12B show two examples of different mode shapes of the rotating element E (e.g., having the shape of a disc).

For a dynamical system, a mode is a standing wave state of excitation, in which all parts of the system will be affected sinusoidally under a specified fixed frequency. A mode of vibration is characterized by a modal frequency and a mode shape. Given a certain component (in particular a rotating element E of the machine), a mode shape corresponds to a characteristic deformation at which the component vibrates when one of its natural frequencies is excited. The vibratory response of the component corresponds to a linear combination of all mode shapes.

The mode shape shown in FIG. 12A has two upward deformations and two downward deformations (e.g., each two maxima and minima). The mode shape shown in FIG. 12B has four maxima and four minima.

Optionally, a predefined mode shape is excited for analysis of the response, e.g., it is known to be critical.

Figure 13A:
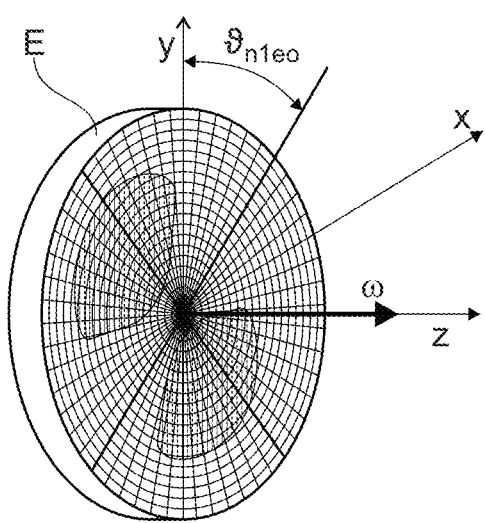
FIGS. 13A and 13B illustrate examples of the effect of a crack or of an initiation of a crack in the rotatable element to the modal stiffness and the mode shape.
Figure 13B:
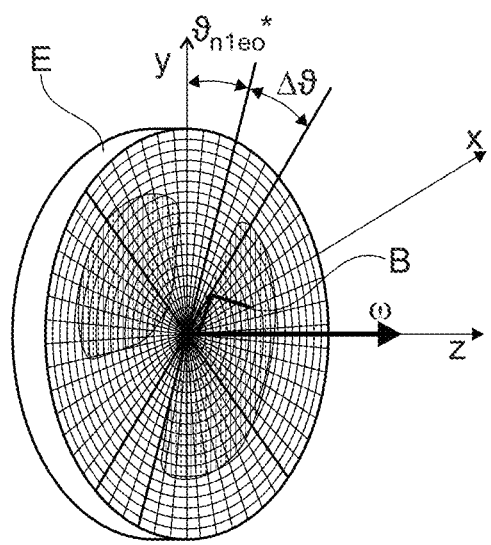

FIGS. 13A and 13B show the application of a mode shape for diagnosis.

A rotating element E of the machine 10D is excited to vibrate in a predetermined mode by the exerted excitation (e.g., using a piezo element as actuator). The mode shape is measured, e.g., by an axial sensor 12 and/or using a sensor detecting reflected light. Without a defect in the rotating element E, the mode shape rotates at the speed of the shaft 100 (at the first engine order), see FIG. 13A. The sensor 12 detects the passing of a characteristic point or line, namely, the portion between the two alternating deflections indicated by a line and with an angle.

When the rotating element E has a defect, however, such as a crack, the mode shape will be altered and the characteristic point/line will be detected at a different angular position with respect to a fixed point on the rotating element E, as indicated in FIG. 13B with delta theta.

Using the phase reference provided by the keyphasor 15, this phase shift may be precisely measured. Measuring this phase shift allows to determine a defect in the rotating element E, which might be any rotating part of the machine 10D.

Figure 14:
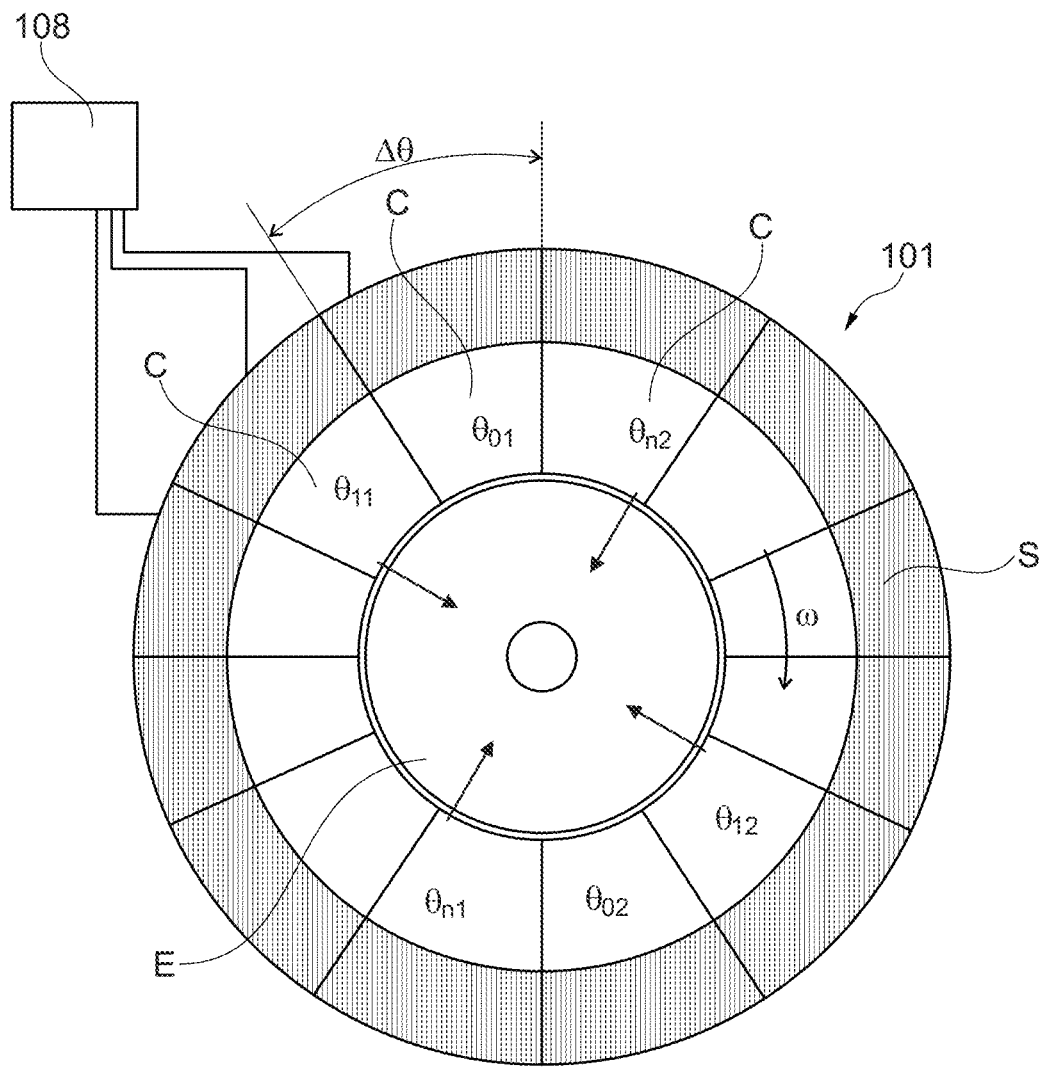
FIG. 14 shows an example of coils of an electric motor that may be used as a sensor and as an actuator.

FIG. 14 shows the electric motor 101 of the machine 10D (however, any of the machines herein may include such an electric motor 101) with an outer stator S and an inner rotor (rotating element E). While FIG. 14 shows the rotor with its geometric center coaxial with the geometric stator center, an air gap between the rotor and the stator allows an eccentric arrangement. In an eccentric arrangement, a clearance between the rotor and the stator S is non-uniform.

The stator S has a plurality of coils $\theta 01$-$\theta n1$, $\theta 02$-$\theta n2$ to drive the rotor (that may have permanent or electric magnets).

Unbalanced magnetic pull may be associated with non-uniform induction due to winding faults or rotor eccentricity conditions. Due to a non-uniform clearance, the magnetic flux in the air gap is also non-uniform, and this may be measured by a sensor 108 connected to the coils $\theta 01$-$\theta n1$, $\theta 02$-$\theta n2$ and/or to a control system of the electric machine 10D so as to receive signals therefrom. For example, magnetic induction in the coils $\theta 01$-$\theta n1$, $\theta 02$-$\theta n2$ may be measured, e.g., by measuring voltages and/or currents at the coils $\theta 01$-$\theta n1$, $\theta 02$-$\theta n2$. For example, pairs of opposing coils $\theta 01$-$\theta n1$ and $002$-$\theta n2$ may be compared by the sensor 108.

Thus, the sensor 108 may detect an unbalance of the rotor. However, because the electric motor 101 is operatively connected to other parts of the driveline of the machine 10D shown in FIG. 5, it is also sensitive to unbalances from rotatable components of the driveline. Thus, the sensor 108 may be used as a vibration sensor. Because it may directly sense vibrations in the driveline, rather than by external sensors, a particularly high precision is possible without the need of further sensors. To this end, the sensor 108 may provide signals indicative for the unbalanced magnetic pull as response indicator to the diagnosis system 13, or it may pre-process unbalanced magnetic pull signals and provide processed signals, e.g., frequency spectra, as response indicator(s) to the diagnosis system 13.

Arrows indicate characteristic portions of an excited mode shape which is depicted schematically.

In turn, the electric motor 101 may serve as an actuator as described above.

The exerted excitation may also be used to de-ice the machine, propeller or other part of the system 1A-1B.

The system 1A-1C is able to detect, in an early manner, electrical drifts in the power electronics or loss of stability in the engine controllers, as well as early signs of mechanical degradation of some of the critical mechanical components of the aircraft. The ability to detect anomalous conditions in the engine at an early stage is also beneficial to avoid the loss of performance related to gradual changes, e.g., in the gap between rotors and stators of an electrical machine, that would remain otherwise undetected until the deterioration further progresses. Examples for parameter drifts that may be detected with the systems and methods described herein are: permanent magnet flux linkage, motor inductances, power switches R_ds, on, switching behavior, symmetry, DC link capacitance, resistance, Battery internal resistance, and inductance.

Some of the parameter variations in the system response may be related to early cracks, increased misalignments, loss of balance, bearing damage, loss of tightening of bolted junctions, wear and tear or out-of-nominal conditions in couplings, initiation of cracks in rotors or in the fuselage, etc.

One possible function of the diagnosis system 13 is to determine a variation of the position of the centerline of one or more rotors of the machine with respect to defined rotating and static parts. This is defined by three coordinates x, y, and z of the center of the rotor and three angles to define misalignment or torsion angle. The centerline may oscillate or orbit, including (radial and/or axial) bouncing (harmonic or transient) movements as degeneration of orbits, including bouncing in axial direction. It may be noticed that the centerline may move at several frequencies due to vibration contemporaneously acting on the rotor.

Another possible function of the diagnosis system 13 is to determine a variation of a stiffness ratio, both total stiffnesses and modal stiffnesses, between different defined locations and/or in different x, y, and z directions or rotations. It is worth noting that this characterization may use the measure of the identification (and shift) in natural frequencies to estimate a stiff variation that may be related by calculations or FEM simulation to a change in the stiffness in the modal stiffness of one or more components.

Another possible function of the diagnosis system 13 is to determine the variation of the vibration vector in xyz in one location or across different locations. The vibration vector in one direction is defined by a module, a frequency and a phase. The phase of a vibration spectral component, or vibration component vector, is very sensitive to local variation in the modal stiffness of the rotor, which is in turn related to defined mode shapes of the rotor. For this reason, measuring the phase shift of certain vibration components, it is possible to detect a crack also of relatively small dimensions.

Figure 15:
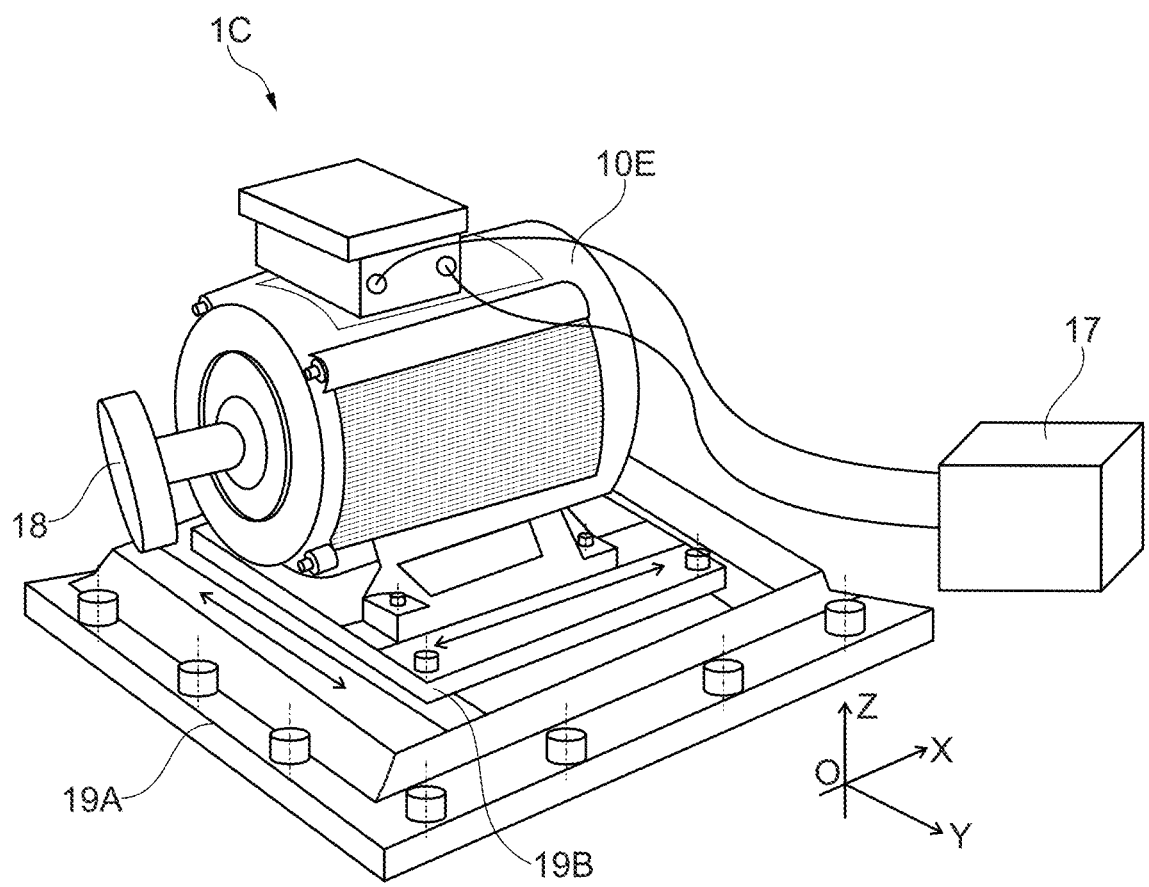
FIG. 15 shows an example of a system with one machine for testing external machinery.

FIG. 15 shows a system 1C for diagnosis of an external device. The external device, which might be an aircraft engine, may be operatively connected by a coupling, such as flexible coupling 18. The system 1C includes a machine 10E which may be designed as one of the machines described herein, e.g., as machine 10D according to FIG. 5. For simplicity, other components of the system 1C are not depicted in FIG. 15, but present, such as the controller 11, sensors 12 and diagnosis system 13.

The machine 10E is mounted on the ground by a 2-dimensional alignment system 19A, 19B which may be a rails-bolts system. The alignment system 19A, 19B allows for aligning the machine 10E to the connected external device in the horizontal plane. A vertical alignment may be made using the flex coupling 18 and/or shimmers.

The system 1C may be used to perform DO160 tests.

The machine 10E is dedicated to providing controlled excitations to both rotating components and to power electronics components 17 that are electrically connected to it. The machine 10E may be used to exert radial and axial forces on the shaft, in addition to a torque modulation and tangential forces that the electric motor of the machine 10E may supply.

An advantage of this system 1C is the capacity to excite at the same time power electronics and rotating mechanical components of external devices under test with the excitation types described above. This allows to test a cross domain reaction to a number of several failure cases that may happen in flight or during the mission of the hybrid/electrical power plant (e.g., in an automotive application, a wind power plan, marine power plan, helicopter, etc.).

Figure 16:
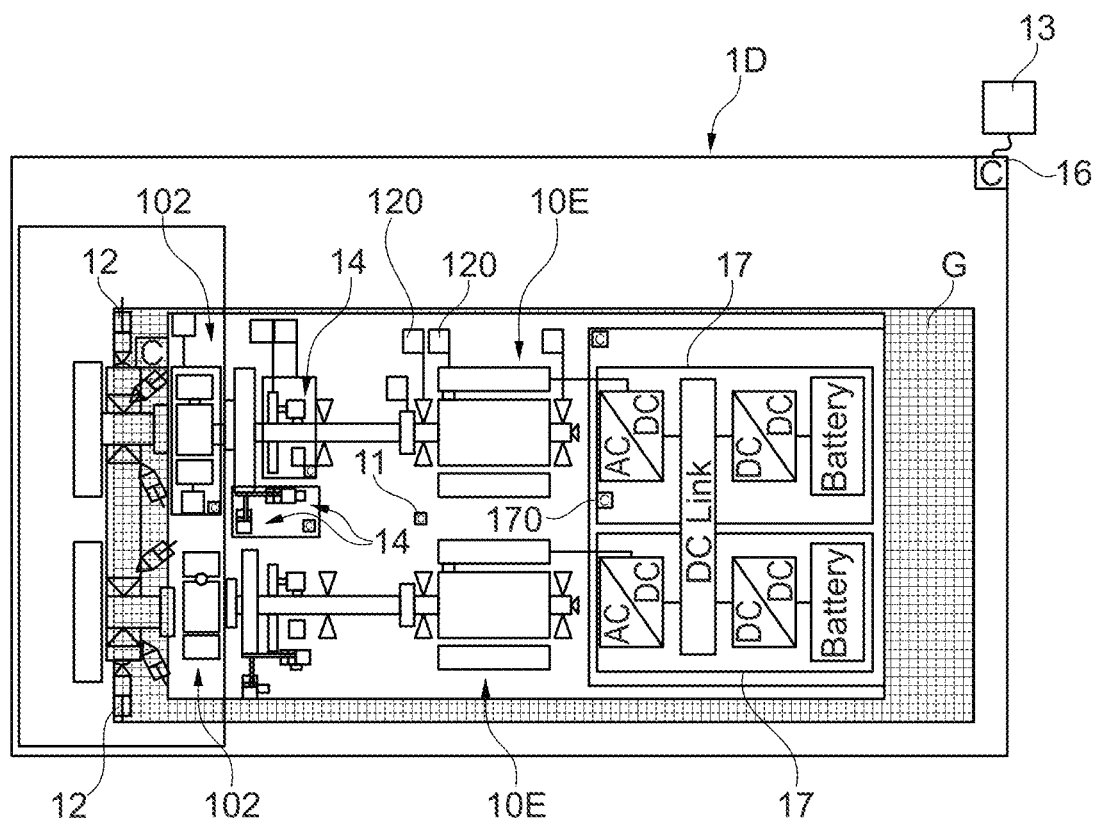
FIG. 16 shows an example of a system with two machines for testing external machinery, wherein a grid of locations is defined in the system, wherein the grid defines a coordinate system of excitation points, output measure points, interface simulation points, to target a certain level of transmitted vibration, the grid including inputs and outputs of controllers.

FIG. 16 shows a system 1D similar to the system 1C of FIG. 15. The system 1D may include the system 1C. Specifically, the system 1D includes more than one machine 10E, in this example two electric machines 10E. For the ease of illustration, the machine 10E and its driveline shown in the upper part of FIG. 16 is shown in more detail than the lower one for the ease of illustration, but both may include identical components.

Each machine 10E is provided with electrical power by respective power electronics 17. In this example, each power electronics 17 includes a battery and a DC-DC converter. The DC-DC converters are connected to a common DC link (optional). Further, each power electronics 17 includes a DC-AC inverter which supplies alternating current to the respective machine 10E. The DC-AC inverters are supplied with DC power from the DC link. Each power electronics 17 includes a controller 170. The controller 170 controls the electrical power supplied to the respective machine 10E. For example, the power electronics 17 may superimpose an excitation on sinusoidal alternating currents, e.g., an excitation in to form of one of the excitations shown in FIGS. 7A-7G.

As described above, the machines 10E, and components in the driveline of the respective machine 10E, include various sensors 12 and respective data acquisition modules 120 (only some of which being shown for illustration). For example, sensors are arranged at bearings of the shaft of each of the machines 10E. Further, several actuators 14 are provided for each machine 10E. The actuators 14 are configured to exert radial, axial, and tangential forces on the drive train (alternatively, or in addition, on a frame supporting the machines 10E and/or their drivelines). Thus, depending on the excitation to be exerted, the actuators 14 may be controlled (by respective controllers, each being indicated with a box labelled with a "C") to selectively exert radial, axial and/or tangential forces.

Rectangles in FIG. 16 indicate which components of the system 1D are controlled by a respective controller indicated by boxes labelled with a "C". Hence, each power electronics 17 includes a controller 170. The plurality of power electronics 17 (two in this case) is controlled by a controller which controls the individual controllers 170. The actuators 14 are controlled by respective controllers. Each machine 10E is controlled by a controller 11 as described above. Further, the overriding controller 16 controls at least the machine 10E controllers 11, in particular, all controllers (directly or in directly via other controllers).

Notably, a grid G is defined in a two-dimensional plane or in a three-dimensional space. Some or all of the components of the system 1E have specified positions on the grid G. The grid G may also allocate and serve to measure input and output at the interfaces, such as the load transmitted from module to module and form module to frame (e.g., rig platform or aircraft platform (frame)). In particular, the positions of the sensors 12 on the grid G are defined and, e.g., stored in one or more of the controllers (e.g., the overriding controller 17; input and output of the controller loops may also be included). In the present example, the positions are stored in the diagnosis system 13. Presently, also the positions of the actuators 14 and of the machines 10E on the grid G are stored in the diagnosis system 13 (alternatively, or additionally, in one or more of the controllers, such as the overriding controller 17).

The grid G may be used as a geometrical reference with ping points and measure points. The grid G may be used as a diagnostic grid together with the state vector which may include the points on the grid G.

Thus, when exerting an excitation at a predefined location on the grid G, the sensors 12 located at various positions on the grid G may sense a response at different times. The diagnosis system 13 is configured to determine the propagation of an excitation over the system 1D based on the response indicators measured by the sensors 12. This allows for discerning different possible defects of one or more machines to be tested connected to the system 1D (e.g., via a clutch or flange coupling).

Using the two machines 10E, the system 1D may exert excitations with each of the machines 10E with an offset in time. Alternatively, or additionally, different excitations may be exerted with the two machines 10E at the same time.

Figure 17:
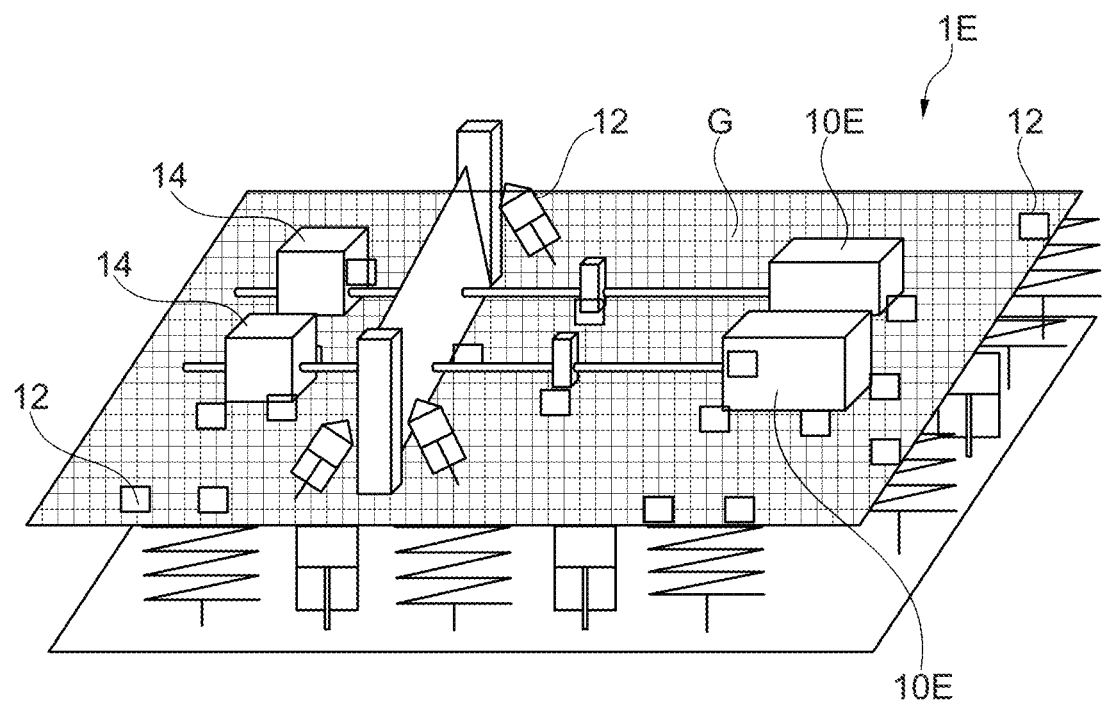
FIG. 17 shows an example of a system similar to the system of FIG. 16, wherein an additional support to simulate interface connections between modules and corresponding load paths between a housing, static bearing supports and rotors is shown and numerous sensors and mechanical and electrical interfaces between modules and between modules and rig or aircraft frame are arranged on the grid.

FIG. 17 shows (in a more simplified manner) a system 1E similar to the system 1D shown in FIG. 16. Here, a two-dimensional grid G is defined, and two machines 10E, actuators 14, and respective shafts are illustrated, supported by a support structure. Further, numerous sensors 12 are arranged at different locations on the grid G, more particularly, distributed over the grid G. All these components are mounted on a planar support, which is supported on a base by support elements having an adjustable stiffness (indicated with the spring constant k). The support elements may exert non-contact forces, e.g., magnetic forces. Actuators and/or sensors below the planar support are configured to exert forces on the planar support and/or to measure a movement of the planar support with respect to the base.

This dynamic grid G may provide adaptive non-contact stiffness modifications, controlled movements of the system actuators, and/or mistuning of integer speed ratios.

The various sensors 12 having defined locations on the grid G provide response indicators that may be analyzed to determine the propagation of an excitation over the grid G. As described above, this allows for discerning different possible defects of one or more machines to be tested connected to the system 1E.

Notably, the grid G may also be defined in any other system described herein, e.g., on the aircraft 2 of FIGS. 1-3.

From the excitation (which may also be referred to as ping) and the measured response (e.g., including drifts of measured parameters), the diagnosis system 13 may extract diagnostic information, generate active compensations at the locations of the ping excitations, and send instructions to other controllers (indicating a determined efficiency loss, vibration, controller non-linearity, and/or AC systems reaction).

With reference to FIGS. 16 and 17, it is worth noting that it is possible that a measure of a load and vibration transmitted is stored, e.g., in the diagnosis system 13, in the directions defined by the load path, e.g., at the static and/or dynamic interfaces. Further, the one or more actuator(s) may be configured to simulate modulations, loads, and/or relative displacements that are expected to be transmitted at one or more of the interfaces of the system.

Figure 18:
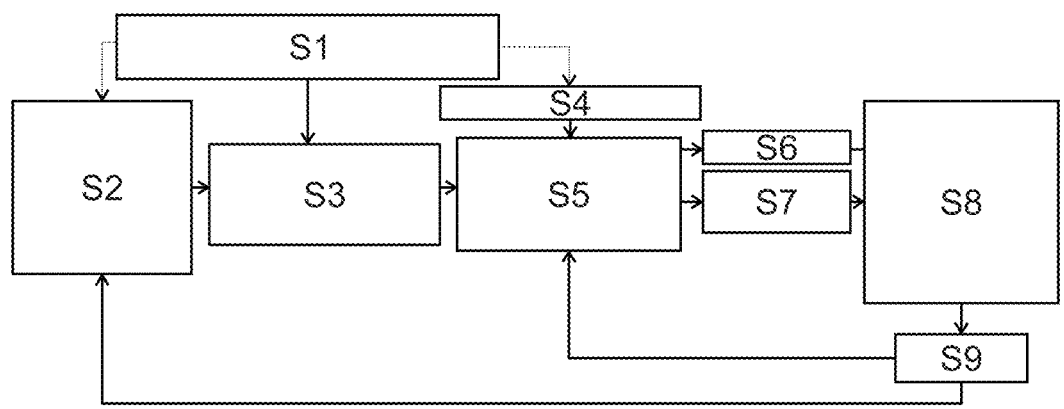
FIG. 18 shows an example of a method of operating a system.

FIG. 18 illustrates a method of operating a system, such as one of the systems described herein.

In act S1, at least one machine 10A-10E (optionally, a plurality of machines) is operated. The operation may be in accordance with a predefined operating condition, such as start-up, taxi-out, take off, initial climb, limb, cruise, descent, approach, landing, or taxi in. The defined condition may also be an inactive condition such as stand still, however, according to an embodiment, the defined condition may be defined as an active condition where at least one machine 10A-10E is active, and in this case stand-still would be excluded. The defined condition is described by at least one operating parameter, such as one or more components of the state vector described above.

Act S1 further includes controlling at least one actuator so as to exert an excitation of the machine 10A-10E and/or to detect a predetermined excitation of the machine 10A-10E, the excitation being superimposed to the defined condition of the machine 10A-10E. The at least one machine 10A-10E may serve as the actuator. Alternatively, or in addition, a device different from the machine 10A-10E may be used, such as a magnetic bearing or a vibrator.

In act S2, at least one response indicator of a response of the machine 10A-10E to the excitation is measured by at least one sensor 12, 108. Further, the parameters of the state vector are recorded. These parameters include performance parameters, control parameters, mechanical parameters, electromagnetic parameters (in particular, AC parameters), and parameters of the excitation. The excitation may serve as a ping. The excitation may be referred to as a ping excitation.

In act S3, a variation of the state vector versus time may be determined. For example, a derivative of each parameter of the state vector may be determined. Further, gradients on the grid G may be determined.

In act S4, a state vector target may be defined and/or provided. Depending on the current defined condition, a certain state vector may define an energy efficient operation of the system.

In act S5, the diagnosis system 13 receives the at least one measured response indicator and the at least one operating parameter. More specifically, the diagnosis system 13 receives the state vector and, optionally, the state vector target. The diagnosis system 13 may perform a conventional analysis of the received data by determining the excitation and the effect of the excitation. Alternatively, or additionally, the diagnosis system 13 may determine covariances in a multi-dimensional space. Further alternatively, or additionally, an artificial intelligence module 130 may be used to analyze the data, e.g., to recognize patterns in the data.

In act S6, the diagnosis system 13 may perform diagnostics, e.g., based on the determined effect, covariances, and/or patterns. For example, specific pre-defined effects, covariances, and/or patterns may indicate a specific defect or wear.

In act S7, the diagnosis system 13 may optionally identify key functional influences. This may be used for improving the operation of the system.

In act S8, corrective actions may be performed based on the diagnostics and/or identification of the key functional influences. For example, a performance and/or safety level may be maintained. A cost reduction may be obtained, e.g., by improving the efficiency of the system, for example, by reducing vibrations. A service disruption reduction may be obtained, e.g., by determining the wearing of a certain component, which may then be exchanged even before developing a defect. In a similar manner, maintenance may be optimized based on the improved knowledge of the condition of the system. In addition, the results of the diagnosis system 13 may also be used for optimizing the design of the system. Further, active vibration (and noise) reduction may be performed, e.g., using various iterations of excitations and the determination of the response.

In act S9, a benefit assessment may be performed, e.g., by the diagnosis system 13. Based on this assessment, a cost reduction may be performed. For example, the selection of sensors for the analysis may be improved and fed back to the next iteration of act S2. For example, if it is determined that a certain sensor is not significant for a certain observable, it may be excluded from the next analysis. Further, the result of the assessment may be fed back to the next iteration of act S5 in order to improve the diagnosis.

The actuators shown in FIGS. 19-23 may be used in any of the systems and methods described herein.

Figure 19:
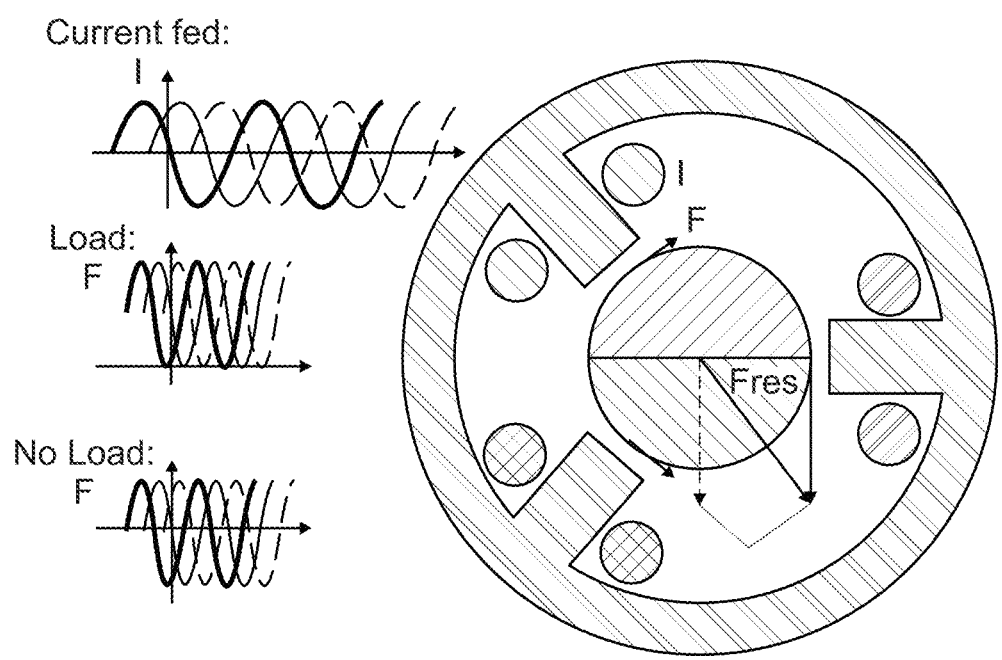

FIG. 19 shows an actuator that may be used in any of the systems described herein, for example, as an actuator of the system of FIG. 5. The actuator of FIG. 19 may be used as electric machine to provide thrust and/or as an electric generator. A rotor includes a permanent magnet and is arranged in a stator having three coils for three phases of an alternating electrical current.

On the left-hand side of FIG. 19, three schematical diagrams are shown. The upper diagram illustrates the current fed for the three phases to drive the rotor. The coils may be fed with currents so as to exert forces on the rotor which have opposite direction and/or different amplitudes, for example, as shown by arrows in FIG. 19. A resulting force $F_{res}$ urges the rotor in a direction perpendicular to its rotational axis. The diagram in the middle and the lower diagram show forces exerted by the three coils on the rotor. For example, sinusoidal components may be superimposed by a constant component. The AC force frequency is twice the electrical current frequency and fixed to the rotational speed via the number of pole pairs. Adding an additional rotational field of smaller amplitude with fixed frequency is possible. Signals like this may be used by sensorless control (e.g., a fixed frequency AC injection on d or q components in the rotor fixed coordinate system). Applying a modulated signal on the excitation winding of a rotor may allow to generate specific force vectors.

FIG. 20A shows another actuator with a rotor (e.g., shaft 100) with a plurality of magnets M on its outer circumference, and a device D having a plurality of magnets M. In the present example, the device is a stator. Both on the rotor and on the stator, the magnets M are arranged in the form of Hallbach arrays. Here, the Hallbach arrays are arranged oppositely to one another. An alternating (normal and tangential) magnetic force excitation may be achieved with opposing Hallbach arrays on rotor and stator. Pulsating normal and alternating tangential magnetic force excitation is possible by reluctance. Excitation may be done by pulse modulation or by a DC-excitation coil. The rotation of the rotor with respect to the stator introduces forces with a frequency that depends on the rotational speed of the rotor (as illustrated with a small schematic diagram). The concept is sensitive to airgap length and may be used as sensor as well.

FIG. 20B shows a similar arrangement as FIG. 20A, however, the magnets M on the rotor do not encompass the rotor over its entire circumference, but only extend over a section of the rotor along its circumference. By this, two different frequencies may be obtained as excitation.

Optionally, the device D is radially movable to enable or disable the excitation. Alternatively, the magnets M on the stator (or on the rotor) may be electric magnets that may be selectively switched on or off.

FIG. 21A shows another actuator with a rotor (e.g., shaft 100) having a plurality of teeth 109. The teeth 109 are uniformly shaped. A device D including a permanent magnet is arranged beside the rotor (and is, optionally, movable in radial direction). This allows to introduce forces with a frequency that depends on the rotational speed of the rotor.

FIG. 21B shows the same concept as FIG. 21A, wherein the device D includes an electric coil (instead of, or in addition to, the permanent magnet). By this, forces with more than one frequency may be exerted.

Figure 22:
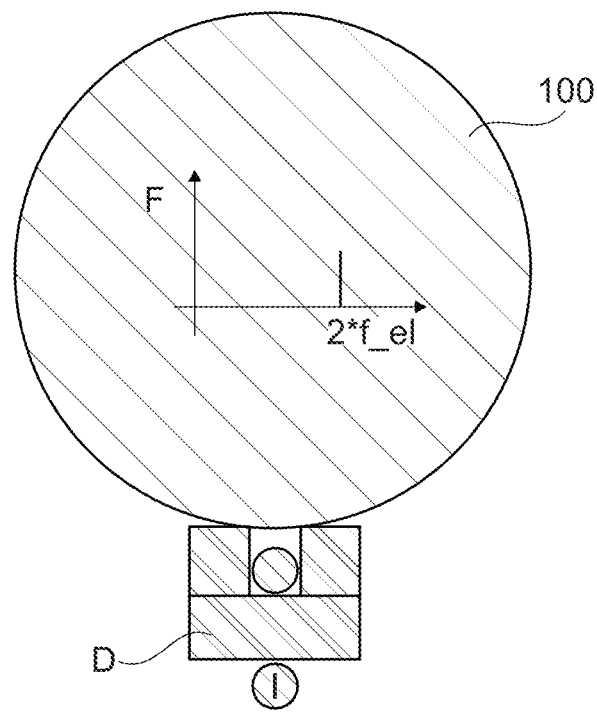

FIG. 22 shows a similar concept as FIG. 21B, wherein the rotor, however, includes no teeth. This allows to induce a force depending on the frequency of the current through the coil with a particularly simple setup. Here, the actuator mainly includes an electric magnet. Electrical excitation and modulation on a isotropic rotor may generate force patterns for various detection methods. As the forces are generated by reluctance, this is sensitive to the airgap length.

The concepts shown in FIGS. 21B and 22 allow an integrated distance measurement, e.g., by analyzing the current through the coil.

The actuator of FIG. 22 may include more than one device D, e.g., three or four devices D arranged (e.g., equidistantly) around the circumference of the rotor. This allows to deflect the rotor in any radial direction. The actuator of FIG. 22 (and the other actuators described herein) may be controlled by the controller 11 as described above.

Figure 23:
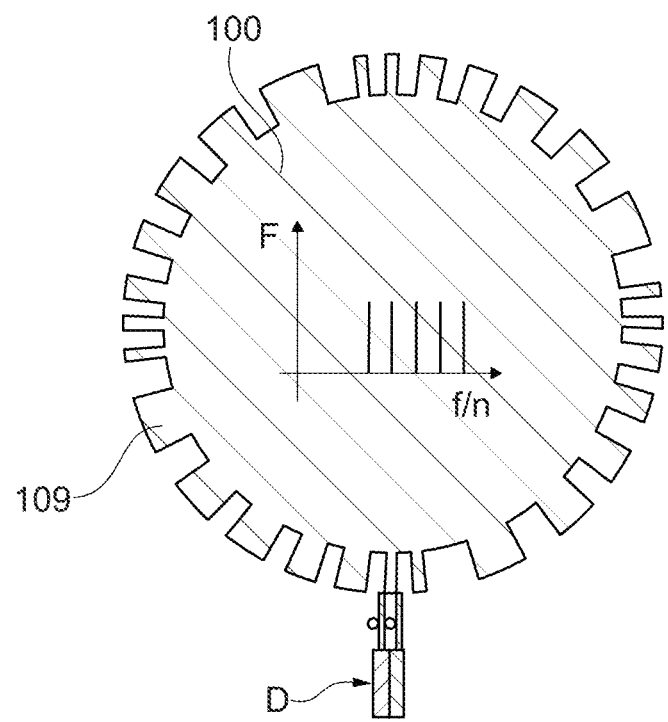

FIG. 23 shows a rotor (e.g., shaft 100) having teeth 109 with non-uniform shape. More specifically, the rotor has teeth 109 with different widths. Here, the rotor has a plurality of sets of teeth having, from tooth to tooth in circumferential direction, an increasing width. A proper design of such rotor poles may enable the excitation of forces with several frequencies resulting from the rotational speed. The device D in this example has a permanent magnet and a coil.

Table 1 associates, for each of the excitations shown in FIGS. 7A-7G, main detection features (second column), and further details when used to create mechanic excitations by an electric machine such as a motor (third column), when used to create mechanic excitations by a dedicated actuator (e.g., actuator 102 or 14 or one of the actuators shown in FIGS. 20A-23) (fourth column), and when used to excitations of electric components by an electric machine 10A-10E such as a motor (fifth column).

For the description of several fields of Table 1, reference is made to the description of FIGS. 19-23 above as indicated in Table 1.

TABLE 1

| Excitation type | Detection features | Mechanic excitation by el. machine | Mechanic excitation by dedicated actuator | Excitation of electric components by el. machine |
|---|---|---|---|---|
| FIG. 7A | A1 | B1 | FIGS. 20A-21B | C1 |
| FIG. 7B | A2 | FIG. 19 | FIGS. 20A-21B | C2 |
| FIG. 7C | A3 | B3 | FIG. 22 | C3 |
| FIG. 7D | A4 | B4 | FIG. 22 | C4 |
| FIG. 7E | A5 | B5 | FIG. 22 | C5 |
| FIG. 7F | A6 | B6 | FIG. 22 | C6 |
| FIG. 7G | A7 | B7 | FIG. 23 | C7 |

Several individual fields of the table are discussed below.

In the following main detection features obtainable using the different excitation patters are presented:

Detect a broadband excitation to measure the frequency response functions of rotors and/or static frames: A1, A7;

Detect a variation of the frequency magnitude: A1;

Detect modal damping and phase of the peaks with respect to the forcing function: A1;

Detect a variation of vibration parameter ratios across different sensor locations: A1, A2, A3, A4, A7;

Detect a variation of vibration magnitude ratios in XYZ directions: A1, A2, A3, A4, A7;

Detect an excitation of specific natural frequencies: A2, A3, A4;

Detect a variation of peaks, frequency, magnitude and/or phase (forcing function): A2, A3, A4;

Detect a phase variation against a rotating fixed reference: A2, A3, A4;

Detect a modal damping variation: A3, A4;

Detect a dynamic stability of the system: A5;

Detect a variation of the forced response of the system: A5;

Detect a variation of damping: A5;

Detect a drift in the system stability: A5;

Detect a response to a step function: A6;

Detect a variation of the response of the system across different locations/directions: A6.

B1: When the excitation of FIG. 7A is exerted with a machine 10A-10E (e.g., motor), force and torque excitation may be done with a transient short circuit; and a permutation in systems with multiple winding systems may generate multiple force vectors.

B3: Superposing an additional rotational field of smaller amplitude with fixed frequency is possible. Signals like this may be used by sensorless control (e.g., fixed frequency AC injection on d or q components in the rotor fixed coordinate system). The amplitude of the excitation signal may follow a predefined trajectory.

B4: See B3. The frequency of the excitation signal may also follow a predefined trajectory.

B5: The pattern of FIG. 7E is similar to an intrinsic current ripple. The amplitude of the excitation may be controlled by the switching frequency. A variable switching frequency is possible. However, the correlation of amplitude and frequency is fixed by inductance and DC voltage.

B6: Controlled load drops or load steps may be applied by a modulation of the reference values for the current controller. Alternating steps (breaking, accelerating) may create the highest excitation. Permutation in systems with multiple winding systems may serve as internal reference for the rotor angle (or speed) response.

B7: Random excitation may be generated by usage of hysteresis current control (enabled either by fast current sensor or observer).

With respect to the fifth column of Table 1, the indicated excitation pattern may be applied to the machines 10A-10E in the form of electric motors in the systems and methods described herein.

C1: Swap the energy from the magnetic field into the DC link capacitors and check the capacity: 1. create currents in the AC system, 2. switch to SSO (six switches open), 3. the currents will commutate via the diodes on the DC link, 4. monitor the DC voltage curve, 5. estimate the DC capacity from the known currents and AC inductance.

C2: 1. Apply of a pulse pattern for a symmetrical voltage system and check the symmetry of the AC current response to: detect inductance variation in the machine, (e.g., by short circuit); detect faults in the power switches, driver stage, etc.; apply higher currents and check symmetry of power switches temperatures; detect faults in one of the parallel chips/dies; monitor the auxiliary power demand of the driver stage/electronics. 2. Use a DC link pre-loading phase when the DC voltage is not yet fully up to measure the parasitic capacity in the AC system to detect a variation of capacities, inductances and/or resistances.

C4: Monitor a current ripple in the AC side and check correlation with a voltage ripple on the DC-capacitors. A variation of switching frequency allows further characterization (and monitoring) of the AC characteristics.

C5: Monitor a current ripple in the AC side and check correlation with voltage ripple on the DC capacitors.

C7: Observers for electronics may be used as a reference for all internal temperatures, powers, voltages and/or currents. The excitation may be random. Calibration of the observer may be performed for these signals. This may be done by self-tuning and intrinsic consideration of the signal processing.

It is worth noting that systems described herein may be configured to provide defined voltage and current excitations and/or defined load and moments excitations. By this dual functionality both the mechanical and electrical systems and controls may be excited, and a diagnosis thereof may be performed.

Further, the systems described herein may be configured to actively mistune and/or control vibrations. For instance, by the excitations the modal stiffness of the mechanical assembly (e.g., the structure and/or rotors) may be adaptively changed using non-contact stiffness generated from the machine(s) 10A-10E (which may be exerted in terms of electromagnetic forces and moments). To provide an example, this may be used to mistune torsional and axial resonances in a shaft connected to an electric machine.

Further, the systems and methods described herein may be used to simulate extreme operational conditions and failure cases (e.g., electromagnetic-thermal-mechanical cross domains), and to enhance signal to noise ratios.

It will be understood that the disclosure is not limited to the embodiments above-described and various modifications and improvements may be made without departing from the concepts described herein. Except where mutually exclusive, any of the features may be employed separately or in combination with any other features and the disclosure extends to and includes all combinations and sub-combinations of one or more features described herein.

Figure 24:
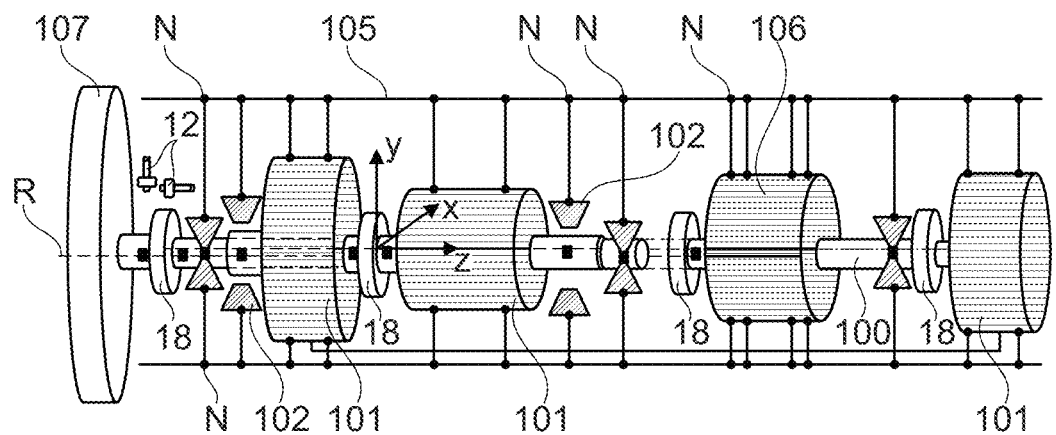
FIGS. 24 to 26 depict views of examples of systems illustrating load paths and grid nodes.
Figure 25:
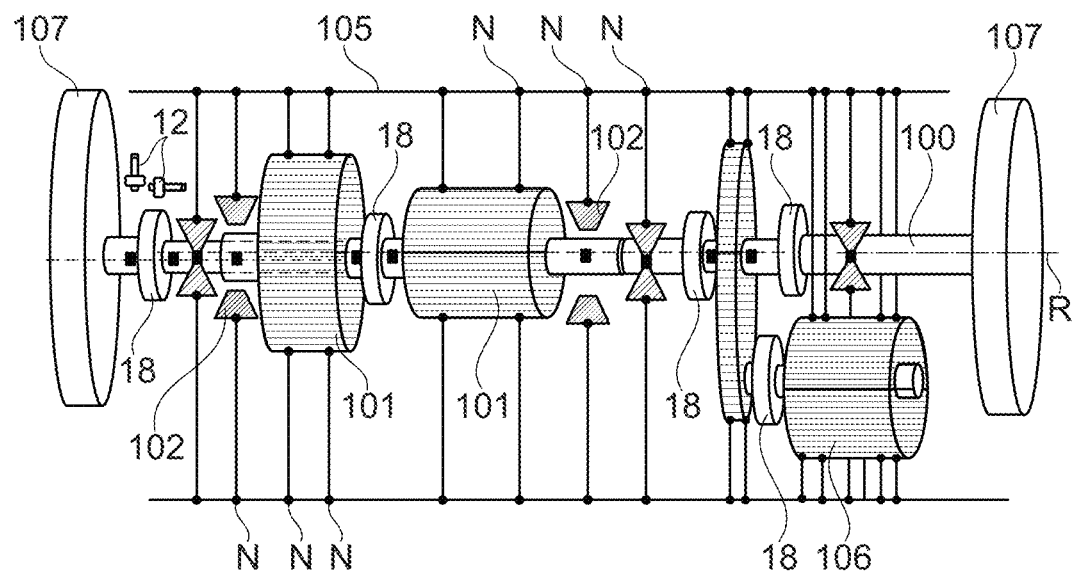

FIGS. 24 and 25 show similar systems as the system 1B shown in FIG. 5.

According to FIG. 24, two electric motors 101 are operated in series with one another via a flex coupling 18, and with a turbomachine 106 via another flex coupling 18. The latter flex coupling 18 may engage or disengage the turbomachine 106 from the electric motors 101. The turbomachine 106 is operated in series with a third electric motor 101 via another flex coupling 18. These electric motors 101 and turbomachine 106 are coupled with a rotating component 107 via another flex coupling 18. A casing 105 is illustrated and the connection of the various components with the casing 105. The interface load paths from the respective component to the casing 105 are illustrated by lines. These interface load paths are connected to the casing at nodes N. The components may or may not have shock absorbers. The diagnostic system 13 may base the analysis of the response indicators on the load path of one or more of the components of the system and/or on the location of a node N (or relative location of two nodes N).

FIG. 25 shows a similar system to FIG. 24, wherein two electric motors 101 are provided and a turbomachine 106 is operatively connected in parallel via a clutch, belt, plate and/or transmission (e.g., a variably geared transmission box).

The nodes N may constitute nodes of the grid G.

Figure 26:
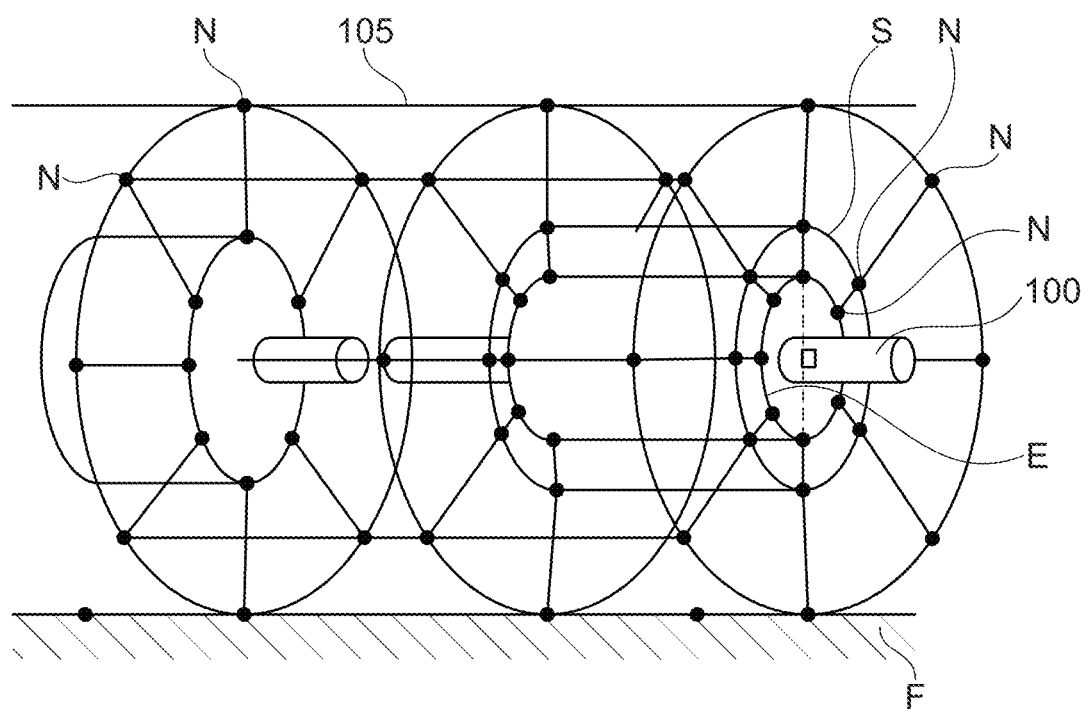

FIG. 26 shows a schematic 3d illustration of an electric machine having a stator S fixedly connected to the casing 105 (and, via the casing 105, to the frame F) and a rotating element E as a rotor fixed to a shaft 100 as well as an optional coupling to further components. As illustrated, the grid G having the nodes N may be defined in three dimensions. The grid G may also include nodes N which have a load path via electromagnetic interactions, such as between the stator S and the rotating element E. Notably, the nodes N may be defined with 6 degrees of freedom, e.g., with three location parameters and three rotation parameters.

It is to be understood that the elements and features recited in the appended claims may be combined in different ways to produce new claims that likewise fall within the scope of the present disclosure. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description

LIST OF REFERENCE NUMBERS 1A-1E system
10A-10E machine
100 shaft
101 electric motor/actuator
102 magnetic bearing/actuator
103A, 103B propeller
104 bearing
105 casing
106 turbomachine
107 rotating component
108 sensor
109 tooth
11 controller
12 sensor
120 data acquisition unit
13 diagnosis system
130 artificial intelligence module
131 memory
14 actuator
15 keyphasor
150 target
16 overriding controller
17 power electronics
170 controller
18 flex coupling
19A, 19B alignment system
2 aircraft
20 energy storage
21 gas turbine engine
22 generator
23 power electronics
B crack
C coil
D device
E rotating element
F frame
G grid
M magnet
N node
R rotational axis
S stator

The invention claimed is:

1. A system comprising:
a frame;
a plurality of machines mounted on the frame, wherein each machine of the plurality of machines comprises an actuator, and wherein each machine of the plurality of machines is configured to be operated in a defined condition;
a plurality of individual controllers configured to control the actuators of the plurality of machines so as to exert an excitation of each machine of the plurality of machines;
an overriding controller configured to coordinate control of the plurality of individual controllers with predetermined offsets in time;
at least one sensor configured to measure at least one response indicator of a response of the system to the excitations of the plurality of machines; and
a diagnosis system configured to receive the at least one measured response indicator.

2. The system of claim 1, wherein the overriding controller is configured to coordinate the control by the plurality of individual controllers simultaneously.

3. The system of claim 2, further comprising:
a keyphasor configured to provide a phase reference,
wherein the diagnosis system is configured to determine a phase of the at least one measured response indicator with respect to the phase reference, and
wherein the diagnosis system is configured to determine a phase shift between the phase of the at least one measured response indicator with respect to the phase reference and a baseline.

4. The system of claim 1, further comprising:
a keyphasor configured to provide a phase reference, wherein the diagnosis system is configured to determine a phase of the at least one measured response indicator with respect to the phase reference, and wherein the diagnosis system is configured to determine a phase shift between the phase of the at least one measured response indicator with respect to the phase reference and a baseline.

5. The system of claim 1, wherein the diagnosis system is configured to:
combine the at least one measured response indicator and at least one operating parameter describing one or more of the defined conditions into a state vector; and
compare the state vector with another state vector acquired at a different time and/or system.

6. The system of claim 1, wherein the at least one sensor comprises a plurality of sensors at different locations of the system, and
wherein the diagnosis system is configured to calculate a ratio of response indicators measured by the plurality of sensors at the different locations.

7. The system of claim 1, wherein the diagnosis system is configured to determine covariances of one or more response indicators and one or more operating parameters describing one or more of the defined conditions to perform a diagnosis of the system.

8. The system of claim 1, wherein the diagnosis system comprises an artificial intelligence module configured to determine one or more correlations in one or more response indicators and one or more operating parameters describing one or more of the defined conditions to perform a diagnosis of the system.

9. The system of claim 1, wherein each excitation is periodical, a single impulse, a sweep, or a rectangular function, and
wherein the diagnosis system is configured to store in a memory a type of the excitation of a machine of the plurality of machines together with the at least one measured response indicator.

10. The system of claim 1, wherein the at least one measured response indicator comprises an electrical parameter of power electronics, the at least one controller, another control unit of the plurality of machines, or a combination thereof.

11. The system of claim 1, wherein the actuator of a respective machine of the plurality of machines is configured to generate non-contact forces and/or moments on the respective machine of the plurality of machines to exert the respective excitation.

12. The system of claim 1, wherein the at least one sensor comprises a proximity probe, an accelerometer, or a strain gauge, and/or
wherein a machine of the plurality of machines comprises an electric motor and/or generator having a plurality of coils, and
wherein the at least one sensor is configured to: receive signals indicative for and/or based on differences among voltages and/or electrical currents of the plurality of coils; and determine a vibration of a shaft of the machine of the plurality of machines using the signals.

13. The system of claim 1, further comprising:
an aircraft,
wherein the plurality of machines are engines of the aircraft.

14. The system of claim 1, wherein the overriding controller is configured to control each individual controller of the plurality of individual controllers so as to control which excitations plurality of machines are exerted at what time.

15. The system of claim 14, wherein the overriding controller is further configured to control a spatial sequence of activation across different actuators distributed across the system.

16. The system of claim 1, wherein each individual controller of the plurality of individual controllers is configured to control a respective actuator of a respective machine of the plurality of machines.

17. The system of claim 1, wherein each machine of the plurality of machines comprises an electric motor, and
wherein the electric motor of each machine functions as a respective actuator.

18. A method comprising:
operating each machine of a plurality of machines mounted on a frame in a defined condition, each machine of the plurality of machines having an actuator;
controlling each actuator of the plurality of machines, by a plurality of individual controllers, so as to exert an excitation of each machine of the plurality of machines;
coordinating, by an overriding controller, control of each individual controller of the plurality of individual controllers with predetermined offsets in time;
measuring, by at least one sensor, at least one response indicator to the excitation of each machine of the plurality of machines; and
receiving, by a diagnosis system, the at least one measured response indicator.

19. The method of claim 18, further comprising:
receiving a phase reference from a keyphasor;
determining, by the diagnosis system, a phase of the at least one measured response indicator with respect to the phase reference; and
determining, by the diagnosis system, a phase shift between the phase of the at least one measured response indicator with respect to the phase reference and a baseline.

20. The method of claim 18, wherein the overriding controller controls each individual controller of the plurality of individual controllers so as to control which excitations of the plurality of machines are exerted at what time.

* * * * *